United States Patent
Kim et al.

(10) Patent No.: US 12,052,688 B2
(45) Date of Patent: Jul. 30, 2024

(54) METHOD AND UE FOR TRANSMITTING SIGNAL IN WIRELESS COMMUNICATION SYSTEM

(71) Applicant: LG ELECTRONICS INC., Seoul (KR)

(72) Inventors: Heejin Kim, Seoul (KR); Seungmin Lee, Seoul (KR); Hanbyul Seo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 400 days.

(21) Appl. No.: 17/421,508

(22) PCT Filed: Oct. 16, 2019

(86) PCT No.: PCT/KR2019/013578
§ 371 (c)(1),
(2) Date: Jul. 8, 2021

(87) PCT Pub. No.: WO2020/145487
PCT Pub. Date: Jul. 16, 2020

(65) Prior Publication Data
US 2022/0095278 A1 Mar. 24, 2022

(30) Foreign Application Priority Data
Jan. 11, 2019 (KR) .......... 10-2019-0004214

(51) Int. Cl.
*H04W 72/02* (2009.01)
*H04W 4/02* (2018.01)
(Continued)

(52) U.S. Cl.
CPC .......... *H04W 72/02* (2013.01); *H04W 4/023* (2013.01); *H04W 72/51* (2023.01); *H04W 4/40* (2018.02)

(58) Field of Classification Search
CPC ..... H04W 72/02; H04W 4/023; H04W 72/51; H04W 4/40; H04W 92/18; H04L 5/00; H04L 27/26
See application file for complete search history.

(56) References Cited

U.S. PATENT DOCUMENTS

| | | | |
|---|---|---|---|
| 2019/0200366 A1* | 6/2019 | Park | H04W 72/542 |
| 2019/0273597 A1* | 9/2019 | Jiang | H04L 5/00 |
| 2020/0057443 A1* | 2/2020 | Silver | G06V 20/584 |

FOREIGN PATENT DOCUMENTS

| | | |
|---|---|---|
| KR | 1020090034551 A | 4/2009 |
| WO | 2018106467 A1 | 6/2018 |

OTHER PUBLICATIONS

Huawei, HiSilicon, "Sidelink physical layer structure for NR V2X", 3GPP TSG RAN WG1 Meeting #95, Nov. 12-16, 2018, R1-1812206.
(Continued)

*Primary Examiner* — Eric Myers
(74) *Attorney, Agent, or Firm* — BRYAN CAVE LEIGHTON PAISNER LLP

(57) ABSTRACT

In an embodiment of the present disclosure, proposed is a method in which a first UE transmits a signal to a second UE in a wireless communication system, the method including: a step in which the first UE receives a first signal from the second UE; a step in which the first UE acquires the distance between the first UE and the second UE on the basis of the received first signal; a step in which the first UE selects, on the basis of the calculated distance, a numerology for transmitting a second signal, or a transmit resource in which the numerology is set; and a step in which the first UE transmits the second signal to the second UE on the basis of the selected numerology or the transmit resource. The UE is capable of communicating with at least one of another UE, a UE related to an autonomous driving vehicle, a base station or a network.

14 Claims, 24 Drawing Sheets

(51) Int. Cl.
*H04W 4/40* (2018.01)
*H04W 72/51* (2023.01)

(56) References Cited

OTHER PUBLICATIONS

Qualcomm Incorporated, "Design aspects and requirements for QoS", 3GPP TSG-RAN WG1 #94, Aug. 20-24, 2018, R1-1809453.
MediaTek Inc., "Discussion on physical layer structure for NR sidelink", 3GPP TSG RAN WG1 Meeting #95, Nov. 12-16, 2018, R1-1812364.

* cited by examiner (a) DMRS location for Rel. 12/13 PSBCH (b) DMRS location for V2V PSBCH (a)

(b)

(a)

(b)

METHOD AND UE FOR TRANSMITTING SIGNAL IN WIRELESS COMMUNICATION SYSTEM

This application is the National Stage filing under 35 U.S.C. 371 of International Application No. PCT/KR2019/013578, filed on Oct. 16, 2019, which claims priority to Korean Patent Application No. 10-2019-0004214, filed on Jan. 11, 2019, the contents of which are all hereby incorporated by reference herein in their entirety.

TECHNICAL FIELD

The present disclosure relates to a wireless communication system and, particularly, to a method and user equipment (UE) for transmitting a signal. More particularly, the present disclosure relates to a method and UE for selecting a candidate resource and transmitting a signal on the selected candidate resource.

BACKGROUND ART

As more and more communication devices demand larger communication capacities, the need for enhanced mobile broadband communication relative to the legacy radio access technologies (RATs) has emerged. Massive machine type communication (mMTC) that provides various services by interconnecting multiple devices and things irrespective of time and place is also one of main issues to be addressed for future-generation communications. A communication system design considering services/user equipments (UEs) sensitive to reliability and latency is under discussion as well. As such, the introduction of a future-generation RAT considering enhanced mobile broadband (eMBB), mMTC, ultra-reliability and low latency communication (URLLC), and so on is being discussed. For convenience, this technology is referred to as new RAT (NR) in the present disclosure. NR is an exemplary 5th generation (5G) RAT.

A new RAT system including NR adopts orthogonal frequency division multiplexing (OFDM) or a similar transmission scheme. The new RAT system may use OFDM parameters different from long term evolution (LTE) OFDM parameters. Further, the new RAT system may have a larger system bandwidth (e.g., 100 MHz), while following the legacy LTE/LTE-advanced (LTE-A) numerology. Further, one cell may support a plurality of numerologies in the new RAT system. That is, UEs operating with different numerologies may co-exist within one cell.

Vehicle-to-everything (V2X) is a communication technology of exchanging information between a vehicle and another vehicle, a pedestrian, or infrastructure. V2X may cover four types of communications such as vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

DISCLOSURE

Technical Problem

An object of the present disclosure is to provide a method of selecting a candidate resource for sidelink signal transmission in consideration of vehicle-to-everything (V2X) communication environments.

Another object of the present disclosure is to provide a method of configuring the length of a sidelink cyclic prefix (CP) in consideration of millimeter wave (mmWave) V2X communication environments.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting a signal by a first user equipment (UE) to a second UE in a wireless communication system is provided. The method may include: receiving, by the first UE, a first signal from the second UE; obtaining, by the first UE, a distance between the first UE and the second UE based on the received first signal; selecting, by the first UE, a numerology for transmission of a second signal or a transmission resource in which the numerology is configured, based on the obtained distance; and transmitting, by the first UE, the second signal to the second UE based on the selected numerology or the selected transmission resource.

The first signal may include information about a location of the second UE.

The obtaining may include obtaining the distance between the first UE and the second UE based on the information about the location of the second UE, and The selecting may include selecting the numerology or the transmission resource based on the distance between the first UE and the second UE.

The information about the location of the second UE may include at least one of a cooperative awareness message (CAM) and a basic safety message (BSM).

The selecting may include selecting the numerology or the transmission resource based on at least one of the CAM and the BSM.

The transmission resource may include at least one of a cyclic prefix (CP) length of the second signal and a subcarrier spacing (SCS) of the second signal.

The selecting may include selecting the numerology or the transmission resource based on the distance between the first UE and the second UE and at least one of the CP length and the SCS.

The first signal may be received in a first frequency region, and the second signal may be transmitted in a second frequency region.

The first frequency region may include lower frequencies than the second frequency region.

The first frequency region may include frequencies less than 6 GHz, and the second frequency region may include frequencies more than or equal to 6 GHz.

The distance between the first UE and the second UE may be calculated by the second UE based on at least one of signal strength of the first signal and channel quality between the first UE and the second UE.

The receiving may include receiving the first signal including information about the distance calculated by the second UE.

The obtaining may include obtaining the distance between the first UE and the second UE based on the information about the distance.

The method may further include transmitting, by the first UE, a third signal including information about the numerology or the transmission resource to the second UE before transmitting the second signal.

The second signal may be decoded by the second UE based on the information about the numerology or the transmission resource.

The third signal may further include bitmap information about the numerology or the transmission resource.

The bitmap information may include one-bit information on whether the numerology or the transmission resource is changed.

The method may further include receiving, by the first UE, control information from a base station.

The selecting may include selecting at least one of the numerology, the transmission resource, or a transmission power based on the received control information.

The control information may include at least one of a plurality of candidate numerologies, a plurality of candidate transmission resources, or a plurality of candidate transmission powers defined for at least one of frequency resources, quality of services (QoS), synchronization error requirements, or UE speeds.

In another aspect of the present disclosure, a first UE configured to receive a signal in a wireless communication system is provided. The first UE may include: a transceiver; and a processor. The processor may be configured to: receive a first signal from a second UE; obtain a distance between the first UE and the second UE based on the received first signal; select a numerology for transmission of a second signal or a transmission resource in which the numerology is configured, based on the obtained distance; and transmit the second signal to the second UE based on the selected numerology or the selected transmission resource.

Advantageous Effects

According to the present disclosure, stable signal transmission and reception between transmitting and receiving user equipments (UEs) may be supported.

In addition, a receiving UE may support a numerology (to be used for data transmission) and/or a candidate transmission resource (e.g., carrier, resource pool, BWP, etc.) in which the corresponding numerology is configured (based on signal transmission and reception on/in another carrier/resource pool/bandwidth part (BWP)).

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

Figure 1:
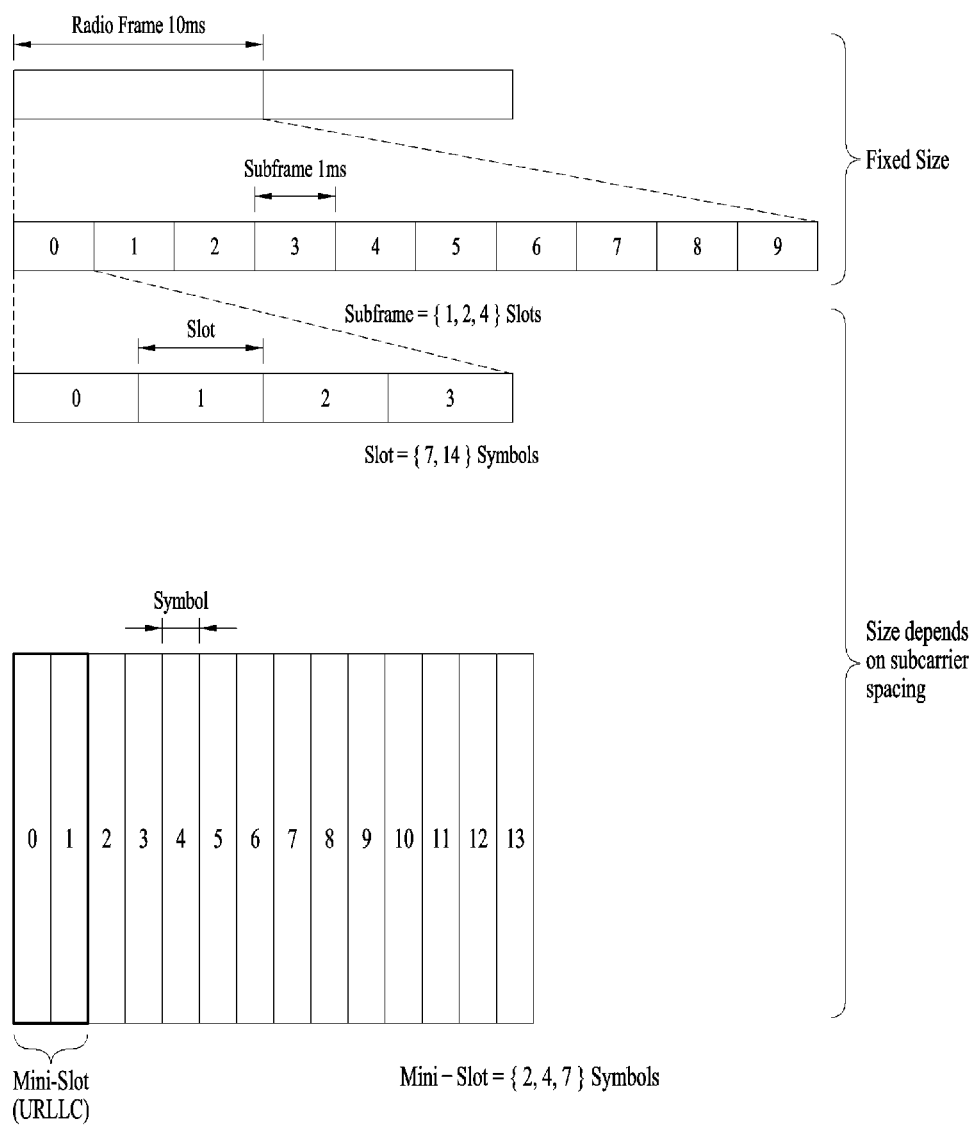
FIG. 1 illustrates a frame structure in new radio (NR)

Hereinafter, downlink (DL) refers to communication from a base station (BS) to a user equipment (UE), and uplink (UL) refers to communication from the UE to the BS. On DL, a transmitter may be a part of the BS and a receiver may be a part of the UE. On UL, the transmitter may be a part of the UE and the receiver may be a part of the BS. In the present disclosure, the BS may be represented as a first communication device and the UE may be represented as a second communication device. The BS may be replaced with the term "fixed station", "Node B", "evolved-Node B (eNB)", "next generation Node B (gNB)", "base transceiver system (BTS)", "access point (AP)", "network or 5G network node", "AI system", "roadside unit (RSU)", or "robot". The UE may be replaced with the term "terminal", "mobile station (MS)", "user terminal (UT)", "mobile subscriber station (MSS), "subscriber station (SS)", "advanced mobile station (AMS)", "wireless terminal (WT)", "machine-type communication (MTC) device", "machine-to-machine (M2M) device", "device-to-device (D2D) device", "vehicle", "robot", or "AI module".

Technology described below may be used in various radio access systems such as a code division multiple access (CDMA) system, a frequency division multiple access (FDMA) system, a time division multiple access (TDMA) system, an orthogonal frequency division multiple access (OFDMA) system, and a single-carrier frequency division multiple access (SC-FDMA) system. CDMA may be implemented by radio technology such as universal terrestrial radio access (UTRA) or CDMA2000. TDMA may be implemented by radio technology such as global system for mobile communications (GSM), general packet radio service (GPRS), or enhanced data rates for GSM evolution (EDGE). OFDMA may be implemented by radio technology such as institute of electrical and electronics engineers (IEEE) 802.11 (Wi-Fi), IEEE 802.16 (WiMAX), IEEE 802.20, or evolved-UTRA (E-UTRA). UTRA is part of universal mobile telecommunications system (UMTS). 3rd generation partnership project (3GPP) long-term evolution (LTE) is part of evolved UMTS (E-UMTS) using E-UTRA and LTE-advanced (LTE-A)/LTE-A pro is an evolved version of 3GPP LTE. 3GPP new radio or new radio access technology (3GPP NR) is an evolved version of 3GPP LTE/LTE-A pro.

For clarity, a description is given based on a 3GPP communication system (e.g., LTE-A or NR) but the scope of the present disclosure is not limited thereto. LTE refers to technology beyond 3GPP TS 36.xxx Release 8. More specifically, LTE technology beyond 3GPP TS 36.xxx Release 10 is referred to as LTE-A, and LTE technology beyond 3GPP TS 36.xxx Release 13 is referred to as LTE-A pro. 3GPP NR refers to technology beyond TS 38.xxx Release 15. LTE/NR may be referred to as a 3GPP system. "xxx" represents a detailed number of a technical specification. LTE/NR may be collectively referred to as a 3GPP system.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, or repeater may be the node. Furthermore, the node may not be the BS. For example, a radio remote head (RRH) or a radio remote unit (RRU) may be the node. Generally, the RRH or RRU has a power level lower than that of the BS. At least one antenna is installed per node. The antenna may refer to a physical antenna or refer to an antenna port, a virtual antenna, or an antenna group. The node may also be called a point.

In the present disclosure, a cell refers to a specific geographical area or a radio resource in or on which one or more nodes provide communication services. The "cell" of the geographic area may be understood as coverage within which a node may provide services using a carrier, and the "cell" of the radio resources is associated with bandwidth, which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of a radio resource used by the node. Accordingly, the term "cell" may be used to indicate service coverage by the node sometimes, the radio resource at other times, or a range within which a signal using the radio resource may reach with valid strength at other times.

In the present disclosure, communicating with a specific cell may mean communicating with a BS or a node that provides communication services to the specific cell. A DL/UL signal of the specific cell refers to a DL/UL signal from/to the BS or the node that provides communication services to the specific cell. A cell that provides UL/DL communication services to a UE is especially called a serving cell. Furthermore, channel status/quality of the specific cell refers to status/quality of a channel or a communication link formed between the BS or the node that provides communication services to the specific cell and the UE.

The "cell" associated with the radio resource may be defined by a combination of DL resources and UL resources, i.e., a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information transmitted through a corresponding cell. In this case, the carrier frequency may be equal to or different from a center frequency of each cell or CC. Hereinbelow, a cell operating on a primary frequency will be referred to as a primary cell (Pcell) or a primary CC (PCC), and a cell operating on a secondary frequency will be referred to as a secondary cell (Scell) or a secondary CC (SCC). The Scell may be configured after a UE and a BS perform a radio resource control (RRC) connection establishment procedure and thus RRC connection is established between the UE and the BS, i.e., after the UE is in an RRC-CONNECTED state. RRC connection may mean a path through which RRC of the UE may exchange messages with RRC of the BS. The Scell may be configured to provide additional radio resources to the UE. The Scell and the Pcell may form a set of serving cells for the UE according to capabilities of the UE. Only one serving cell configured with the Pcell exists for an RRC_CONNECTED UE which is not configured with carrier aggregation or does not support carrier aggregation.

A cell supports a unique RAT. For example, LTE RAT-based transmission/reception is performed in an LTE cell, and 5G RAT-based transmission/reception is performed in a 5G cell.

Carrier aggregation (CA) aggregates a plurality of carriers each having a narrower system bandwidth than a target bandwidth to support broadband. CA differs from OFDMA in that DL or UL communication is performed using a plurality of carrier frequencies each forming a system bandwidth (or channel bandwidth) in the former, and DL or UL communication is performed by carrying a basic frequency band divided into a plurality of orthogonal subcarriers in one carrier frequency in the latter. In OFDMA or orthogonal frequency division multiplexing (OFDM), for example, one frequency band having a certain system bandwidth is divided into a plurality of subcarriers with a predetermined subcarrier spacing, information/data is mapped to the plurality of subcarriers, and the frequency band in which the information/data has been mapped is transmitted in a carrier frequency of the frequency band through frequency upconversion. In wireless CA, frequency bands each having a system bandwidth and a carrier frequency may be used simultaneously used for communication, and each frequency band used in CA may be divided into a plurality of subcarriers with a predetermined subcarrier spacing.

The 3GPP-based communication standards define DL physical channels corresponding to resource elements (REs) carrying information originated from upper layers of a physical layer (e.g., a medium access control (MAC) layer, a radio link control (RLC) layer, a packet data convergence protocol (PDCP) layer, an RRC layer, a service data adaptation protocol (SDAP) layer, and a non-access stratum (NAS) layer), and DL physical signals corresponding to REs which are used in the physical layer but do not deliver information originated from the upper layers. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal (RS) and a synchronization signal are defined as the DL physical signals. The RS, also called a pilot, means a signal of a predefined special waveform known to both a BS and a UE. For example, a cell-specific RS (CRS), a UE-specific RS (UE-RS), a positioning RS (PRS), a channel state information RS (CSI-RS), and a demodulation RS (DMRS) are defined as DL RSs. The 3GPP-based communication standards also define UL physical channels corresponding to REs carrying information originating from upper layers, and UL physical signals corresponding to REs which are used in the physical layer but do not carry information originating from the upper layers. For example, a physical uplink shared channel (PUSCH), a physical uplink control channel (PUCCH), and a physical random access channel (PRACH) are defined as the UL physical channels, and a DMRS for a UL control/data signal and a sounding reference signal (SRS) used for UL channel measurement are defined for the UL physical signals.

In the present disclosure, the PDCCH and the PDSCH may refer to a set of time-frequency resources or REs that carry downlink control information (DCI) and DL data, respectively. The PUCCH, PUSCH, and PRACH refer to a set of time-frequency resources or REs that carry uplink control information (UCI), UL data, and random access signals, respectively. In the following description, "the UE transmits a UL physical channel (e.g., a PUCCH, PUSCH, or PRACH)" may mean that the UE transmits the UCI, UL data, or random access signals on or through the UL physical channel, and "the BS receives a UL physical channel" may mean that the BS receives the UCI, UL data, or random access signal on or through the UL physical channel. "The BS transmits a DL physical channel (e.g., a PDCCH or PDSCH)" may mean that the BS transmits the DCI or DL data on or through the DL physical channel, and "the UE receives a DL physical channel" may mean that the UE receives the DCI or DL data on or through the DL physical channel.

In the present disclosure, a transport block (TB) is payload for a physical layer. For example, data provided to the physical layer by an upper layer or a MAC layer is basically referred to as a TB.

In the present disclosure, hybrid automatic repeat and request (HARQ) is a kind of error control technique. HARQ acknowledgement (HARQ-ACK) transmitted on DL is used for error control of UL data, and HARQ-ACK transmitted on UL is used for error control of DL data. A transmitter performing a HARQ operation awaits reception of ACK after transmitting data (e.g., a TB or a codeword). A receiver performing a HARQ operation transmits ACK only when data has been successfully received and transmits negative ACK (NACK) when the received data has an error. Upon receipt of ACK, the transmitter may transmit (new) data, and upon receipt of NACK, the transmitter may retransmit the data. Time delay occurs until a BS receives ACK/NACK from a UE and transmits retransmission data after transmitting scheduling information and data according to the scheduling information. The time delay is generated due to channel propagation delay or time consumed for data decoding/encoding. Accordingly, if new data is transmitted after a HARQ process which is currently in progress is ended, a gap in data transmission occurs due to time delay. In order to prevent the gap in data transmission from occurring during a time delay duration, a plurality of independent HARQ processes is used. For example, when there are 7 transmission occasions between initial transmission and retransmission, a communication device may perform 7 independent HARQ processes to transmit data without any gap. A plurality of parallel HARQ processes enables successive UL/DL transmission while the device awaits HARQ feedback for previous UL/DL transmission.

In the present disclosure, CSI generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

In the present disclosure, frequency division multiplexing (FDM) may mean that signals/channels/users are transmitted/received on different frequency resources, and time division multiplexing (TDM) may mean that signals/channels/users are transmitted/received on different time resources.

In the present disclosure, frequency division duplex (FDD) refers to a communication scheme in which UL communication is performed on a UL carrier and DL communication is performed on a DL carrier linked to the UL carrier, and time division duplex (TDD) refers to a communication scheme in which UL and DL communication are performed by splitting time.

The details of the background, terminology, abbreviations, etc. used herein may be found in documents published before the present disclosure. For example, 3GPP TS 24 series, 3GPP TS 34 series, and 3GPP TS 38 series may be referenced (http://www.3gpp.org/specifications/specification-numbering).

Frame Structure

FIG. 1 is a diagram illustrating a frame structure in NR.

The NR system may support multiple numerologies. The numerology is defined by a subcarrier spacing and cyclic prefix (CP) overhead. A plurality of subcarrier spacings may be derived by scaling a basic subcarrier spacing by an integer N (or $\mu$). The numerology may be selected independently of the frequency band of a cell although it is assumed that a small subcarrier spacing is not used at a high carrier frequency. In addition, the NR system may support various frame structures based on the multiple numerologies.

Hereinafter, an OFDM numerology and a frame structure, which may be considered in the NR system, will be described. Table 1 shows multiple OFDM numerologies supported in the NR system. The value of $\mu$ for a bandwidth part and a CP may be obtained by RRC parameters provided by the BS.

TABLE 1

| μ | $\Delta f = 2^\mu * 15$ [kHz] | Cyclic prefix (CP) |
| --- | --- | --- |
| 0 | 15 | Normal |
| 1 | 30 | Normal |
| 2 | 60 | Normal, Extended |
| 3 | 120 | Normal |
| 4 | 240 | Normal |

The NR system supports multiple numerologies (e.g., subcarrier spacings) to support various 5G services. For example, the NR system supports a wide area in conventional cellular bands in a subcarrier spacing of 15 kHz and supports a dense urban environment, low latency, and wide carrier BW in a subcarrier spacing of 30/60 kHz. In a subcarrier spacing of 60 kHz or above, the NR system supports a BW higher than 24.25 GHz to overcome phase noise.

Resource Grid

Figure 2:
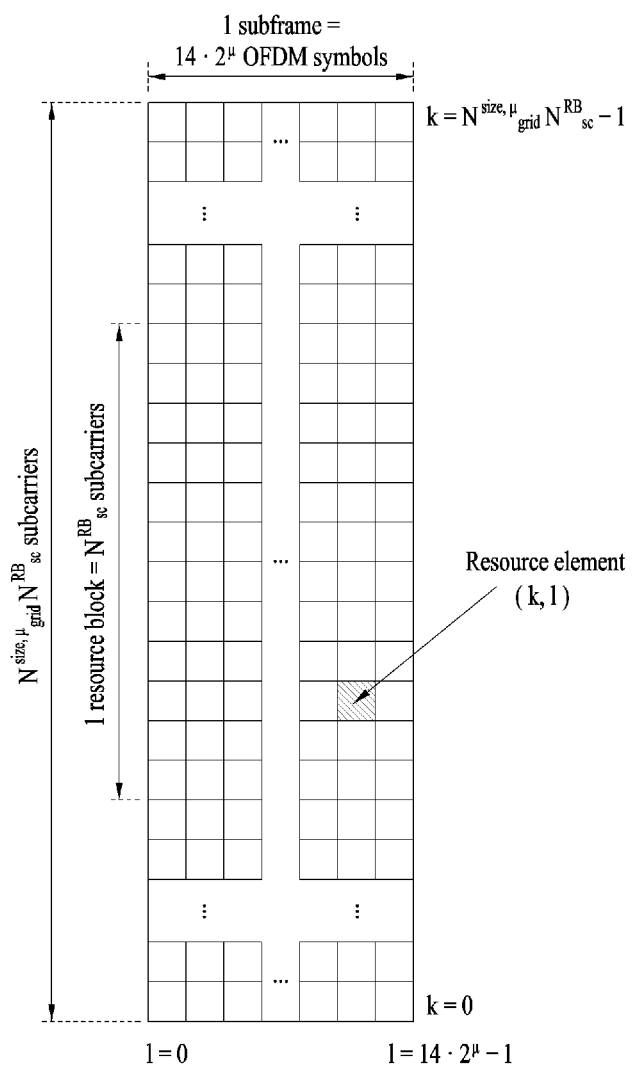
FIG. 2 illustrates a resource grid in NR.

FIG. 2 illustrates a resource grid in the NR.

Referring to FIG. 2, a resource grid consisting of $N^{size,\mu}_{grid} * N^{RB}_{sc}$ subcarriers and $14*2^\mu$ OFDM symbols may be defined for each subcarrier spacing configuration and carrier, where $N^{size,\mu}_{grid}$ is indicated by RRC signaling from the BS. $N^{size,\mu}_{grid}$ may vary not only depending on the subcarrier spacing configuration μ but also between UL and DL. One resource grid exists for the subcarrier spacing configuration y, an antenna port p, and a transmission direction (i.e., UL or DL). Each element in the resource gird for the subcarrier spacing configuration μ and the antenna port p may be referred to as a resource element and identified uniquely by an index pair of (k, l), where k denotes an index in the frequency domain and l denotes the relative location of a symbol in the frequency domain with respect to a reference point. The resource element (k, l) for the subcarrier spacing configuration μ and the antenna port p may be a physical resource and a complex value, $a^{(p,\mu)}_{k,l}$. A resource block (RB) is defined as $N^{RB}_{sc}$ consecutive subcarriers in the frequency domain (where $N^{RB}_{sc}=12$).

Considering that the UE is incapable of supporting a wide BW supported in the NR system, the UE may be configured to operate in a part of the frequency BW of a cell (hereinafter referred to as a bandwidth part (BWP)).

Bandwidth Part (BWP)

The NR system may support up to 400 MHz for each carrier. If the UE always keeps a radio frequency (RF) module on for all carriers while operating on such a wideband carrier, the battery consumption of the UE may increase. Considering multiple use cases (e.g., eMBB, URLLC, mMTC, V2X, etc.) operating in one wideband carrier, a different numerology (e.g., subcarrier spacing) may be supported for each frequency band of the carrier. Further, considering that each UE may have a different capability regarding the maximum BW, the BS may instruct the UE to operate only in a partial BW rather than the whole BW of the wideband carrier. The partial bandwidth is referred to as the BWP. The BWP is a subset of contiguous common RBs defined for numerology pi in BWP i of the carrier in the frequency domain, and one numerology (e.g., subcarrier spacing, CP length, and/or slot/mini-slot duration) may be configured for the BWP.

The BS may configure one or more BWPs in one carrier configured for the UE. Alternatively, if UEs are concentrated in a specific BWP, the BS may move some UEs to another BWP for load balancing. For frequency-domain inter-cell interference cancellation between neighbor cells, the BS may configure BWPs on both sides of a cell except for some central spectra in the whole BW in the same slot. That is, the BS may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), instruct the UE to switch to another configured DL/UL BWP (by L1 signaling, a MAC CE, or RRC signaling), or set a timer value and switch the UE to a predetermined DL/UL BWP upon expiration of the timer value. In particular, an activated DL/UL BWP is referred to as an active DL/UL BWP. While performing initial access or before setting up an RRC connection, the UE may not receive a DL/UL BWP configuration. A DL/UL BWP that the UE assumes in this situation is referred to as an initial active DL/UL BWP.

Synchronization Acquisition of Sidelink UE

In time division multiple access (TDMA) and frequency division multiple access (FDMA) systems, accurate time and frequency synchronization is essential. If time and frequency synchronization is not accurate, inter-symbol interference (ISI) and inter-carrier interference (ICI) may occur so that system performance may be degraded. This may occur in V2X. For time/frequency synchronization in V2X, a sidelink synchronization signal (SLSS) may be used in the physical layer, and master information block-sidelink-V2X (MIB-SL-V2X) may be used in the RLC layer.

Figure 3:
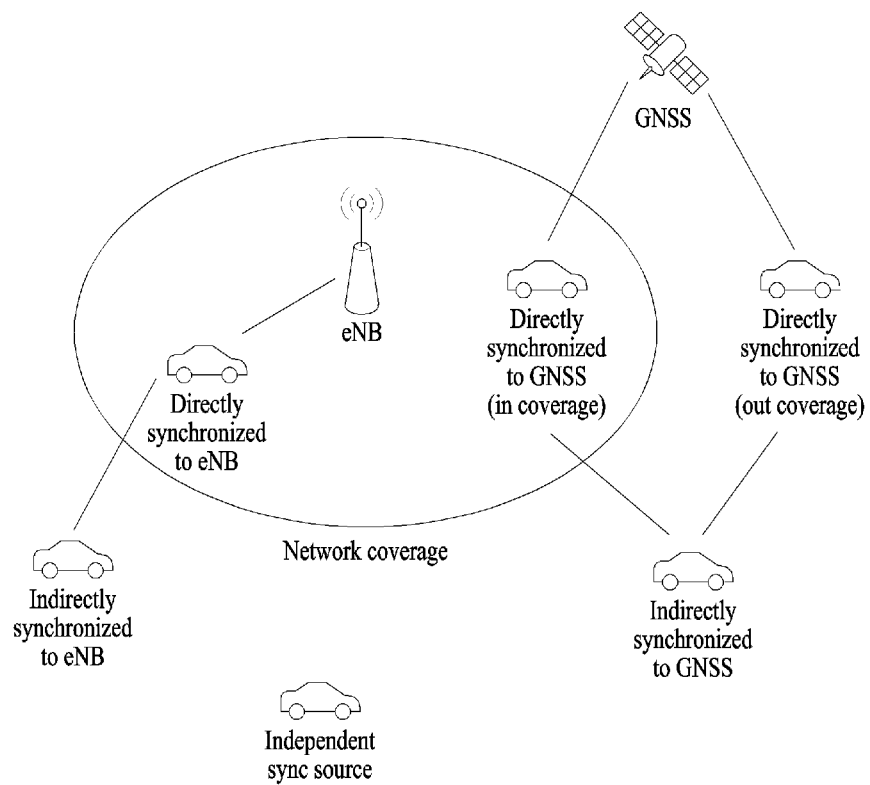
FIG. 3 illustrates sidelink synchronization.

FIG. 3 illustrates a synchronization source and a synchronization reference in V2X.

Referring to FIG. 3, in V2X, a UE may be directly synchronized to global navigation satellite systems (GNSS) or indirectly synchronized to the GNSS through another UE (in or out of the network coverage) that is directly synchronized to the GNSS. When the GNSS is set to the synchronization source, the UE may calculate a direct frame number (DFN) and a subframe number based on coordinated universal time (UTC) and a (pre)configured DFN offset.

Alternatively, the UE may be directly synchronized to the BS or synchronized to another UE that is time/frequency synchronized to the BS. For example, if the UE is in the coverage of the network, the UE may receive synchronization information provided by the BS and be directly synchronized to the BS. Thereafter, the UE may provide the synchronization information to another adjacent UE. If the timing of the BS is set to the synchronization reference, the UE may follow a cell associated with a corresponding frequency (if the UE is in the cell coverage at the corresponding frequency) or follow a PCell or serving cell (if the UE is out of the cell coverage at the corresponding frequency) for synchronization and DL measurement.

The serving cell (BS) may provide a synchronization configuration for carriers used in V2X sidelink communication. In this case, the UE may follow the synchronization configuration received from the BS. If the UE detects no cell from the carriers used in the V2X sidelink communication and receives no synchronization configuration from the serving cell, the UE may follow a predetermined synchronization configuration.

Alternatively, the UE may be synchronized to another UE that fails to directly or indirectly obtain the synchronization information from the BS or GNSS. The synchronization source and preference may be preconfigured for the UE or configured in a control message from the BS.

Hereinbelow, the SLSS and synchronization information will be described.

The SLSS may be a sidelink-specific sequence and include a primary sidelink synchronization signal (PSSS) and a secondary sidelink synchronization signal (SSSS).

Each SLSS may have a physical layer sidelink synchronization identity (ID), and the value may be, for example, any of 0 to 335. The synchronization source may be identified depending on which of the above values is used. For example, 0, 168, and 169 may indicate the GNSS, 1 to 167 may indicate the BS, and 170 to 335 may indicate out-of-coverage. Alternatively, among the values of the physical layer sidelink synchronization ID, 0 to 167 may be used by the network, and 168 to 335 may be used for the out-of-coverage state.

Figure 4:
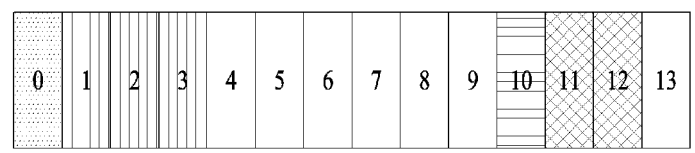
FIG. 4 illustrates a time resource unit for transmitting a sidelink synchronization signal.
Figure 4:
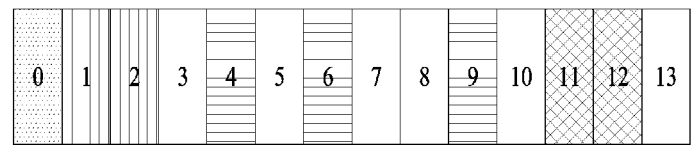
Figure 4:
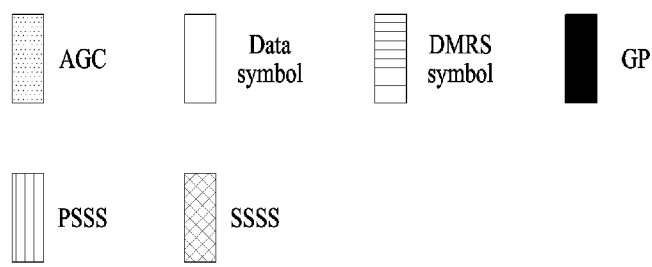
Figure 5:
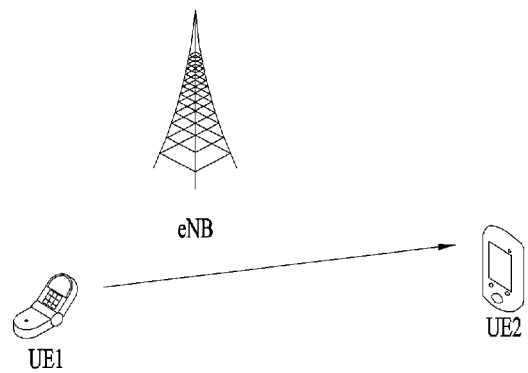
FIGS. 5(a) and 5(b) are views illustrating an exemplary resource pool for sidelink.
Figure 5:
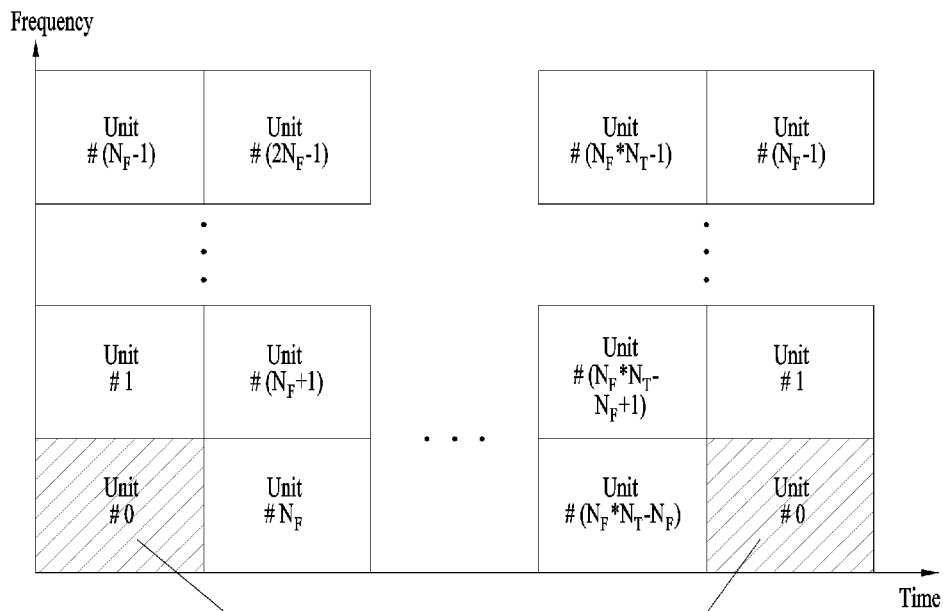
Figure 6:
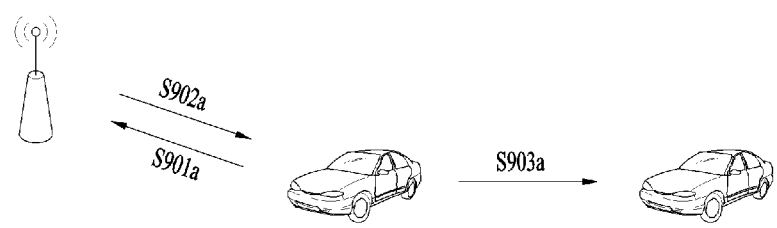
FIGS. 6(a) and 6(b) are views referred to for describing transmission modes and scheduling schemes for sidelink.
Figure 6:
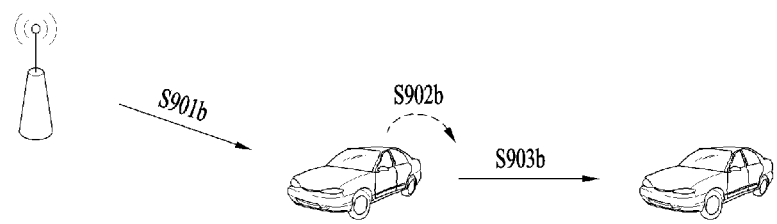

FIG. 4 illustrates a time resource unit for SLSS transmission. The time resource unit may be a subframe in LTE/LTE-A and a slot in 5G. The details may be found in 3GPP TS 36 series or 3GPP TS 28 series. A physical sidelink broadcast channel (PSBCH) may refer to a channel for carrying (broadcasting) basic (system) information that the UE needs to know before sidelink signal transmission and reception (e.g., SLSS-related information, a duplex mode (DM), a TDD UL/DL configuration, information about a resource pool, the type of an SLSS-related application, a subframe offset, broadcast information, etc.). The PSBCH and SLSS may be transmitted in the same time resource unit, or the PSBCH may be transmitted in a time resource unit after that in which the SLSS is transmitted. A DMRS may be used to demodulate the PSBCH.

Sidelink Transmission Mode

For sidelink communication, transmission modes 1, 2, 3 and 4 are used.

In transmission mode 1/3, the BS performs resource scheduling for UE 1 over a PDCCH (more specifically, DCI) and UE 1 performs D2D/V2X communication with UE 2 according to the corresponding resource scheduling. After transmitting sidelink control information (SCI) to UE 2 over a physical sidelink control channel (PSCCH), UE 1 may transmit data based on the SCI over a physical sidelink shared channel (PSSCH). Transmission modes 1 and 3 may be applied to D2D and V2X, respectively.

Transmission mode 2/4 may be a mode in which the UE performs autonomous scheduling (self-scheduling). Specifically, transmission mode 2 is applied to D2D. The UE may perform D2D operation by autonomously selecting a resource from a configured resource pool. Transmission mode 4 is applied to V2X. The UE may perform V2X operation by autonomously selecting a resource from a selection window through a sensing process. After transmitting the SCI to UE 2 over the PSCCH, UE 1 may transmit data based on the SCI over the PSSCH. Hereinafter, the term 'transmission mode' may be simply referred to as 'mode'.

Control information transmitted by a BS to a UE over a PDCCH may be referred to as DCI, whereas control information transmitted by a UE to another UE over a PSCCH may be referred to as SCI. The SCI may carry sidelink scheduling information. The SCI may have several formats, for example, SCI format 0 and SCI format 1.

SCI format 0 may be used for scheduling the PSSCH. SCI format 0 may include a frequency hopping flag (1 bit), a resource block allocation and hopping resource allocation field (the number of bits may vary depending on the number of sidelink RBs), a time resource pattern (7 bits), a modulation and coding scheme (MCS) (5 bits), a time advance indication (11 bits), a group destination ID (8 bits), etc.

SCI format 1 may be used for scheduling the PSSCH. SCI format 1 may include a priority (3 bits), a resource reservation (4 bits), the location of frequency resources for initial transmission and retransmission (the number of bits may vary depending on the number of sidelink subchannels), a time gap between initial transmission and retransmission (4 bits), an MCS (5 bits), a retransmission index (1 bit), a reserved information bit, etc. Hereinbelow, the term 'reserved information bit' may be simply referred to as 'reserved bit'. The reserved bit may be added until the bit size of SCI format 1 becomes 32 bits.

SCI format 0 may be used for transmission modes 1 and 2, and SCI format 1 may be used for transmission modes 3 and 4.

Sidelink Resource Pool

Figure 8:
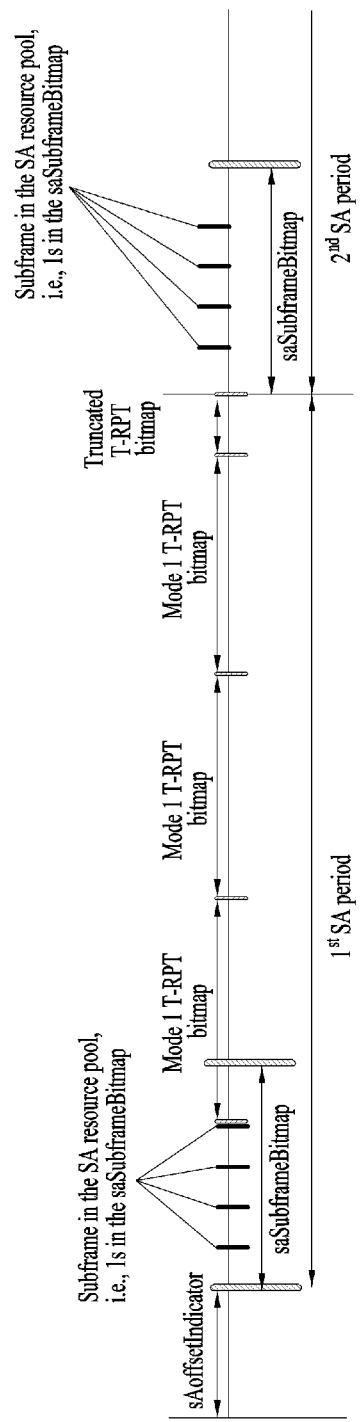
FIG. 8 illustrates transmission of a physical sidelink control channel (PSCCH).

FIG. 8 shows an example of a first UE (UE1), a second UE (UE2) and a resource pool used by UE1 and UE2 performing sidelink communication.

In FIG. 8(a), a UE corresponds to a terminal or such a network device as an eNB transmitting and receiving a signal according to a sidelink communication scheme. A UE selects a resource unit corresponding to a specific resource from a resource pool corresponding to a set of resources and the UE transmits a sidelink signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB may inform UE1 of the resource pool. If UE1 is located at the outside of coverage of the eNB, the resource pool may be informed by a different UE or may be determined by a predetermined resource. In general, a resource pool includes a plurality of resource units. A UE selects one or more resource units from among a plurality of the resource units and may be able to use the selected resource unit(s) for sidelink signal transmission. FIG. 8(b) shows an example of configuring a resource unit. Referring to FIG. 8(b), the entire frequency resources are divided into the NF number of resource units and the entire time resources are divided into the NT number of resource units. In particular, it is able to define NF*NT number of resource units in total. In particular, a resource pool may be repeated with a period of NT subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a sidelink signal.

A resource pool may be classified into various types. First of all, the resource pool may be classified according to contents of a sidelink signal transmitted via each resource pool. For example, the contents of the sidelink signal may be classified into various signals and a separate resource pool may be configured according to each of the contents. The contents of the sidelink signal may include a scheduling assignment (SA or physical sidelink control channel (PSCCH)), a sidelink data channel, and a discovery channel. The SA may correspond to a signal including information on a resource position of a sidelink data channel, information on a modulation and coding scheme (MCS) necessary for modulating and demodulating a data channel, information on a MIMO transmission scheme, information on a timing advance (TA), and the like. The SA signal may be transmitted on an identical resource unit in a manner of being multiplexed with sidelink data. In this case, an SA resource pool may correspond to a pool of resources that an SA and sidelink data are transmitted in a manner of being multiplexed. The SA signal may also be referred to as a sidelink control channel or a physical sidelink control channel (PSCCH). The sidelink data channel (or, physical sidelink shared channel (PSSCH)) corresponds to a resource pool used by a transmitting UE to transmit user data. If an SA and a sidelink data are transmitted in a manner of being multiplexed in an identical resource unit, sidelink data channel except SA information may be transmitted only in a resource pool for the sidelink data channel In other word, REs, which are used to transmit SA information in a specific resource unit of an SA resource pool, may also be used for transmitting sidelink data in a sidelink data channel resource pool. The discovery channel may correspond to a resource pool for a message that enables a neighboring UE to discover transmitting UE transmitting information such as ID of the UE, and the like.

Despite the same contents, sidelink signals may use different resource pools according to the transmission and reception properties of the sidelink signals. For example, despite the same sidelink data channels or the same discovery messages, they may be distinguished by different resource pools according to transmission timing determination schemes for the sidelink signals (e.g., whether a sidelink signal is transmitted at the reception time of a synchronization reference signal or at a time resulting from applying a predetermined TA to the reception time of the synchronization reference signal), resource allocation schemes for the sidelink signals (e.g., whether an eNB configures the transmission resources of an individual signal for an individual transmitting UE or the individual transmitting UE autonomously selects the transmission resources of an individual signal in a pool), the signal formats of the sidelink signals (e.g., the number of symbols occupied by each sidelink signal in one subframe or the number of subframes used for transmission of a sidelink signal), signal strengths from the eNB, the transmission power of a sidelink UE, and so on. In sidelink communication, a mode in which an eNB directly indicates transmission resources to a sidelink transmitting UE is referred to as sidelink transmission mode 1, and a mode in which a transmission resource area is preconfigured or the eNB configures a transmission resource area and the UE directly selects transmission resources is referred to as sidelink transmission mode 2. In sidelink discovery, a mode in which an eNB directly indicates resources is referred to as Type 2, and a mode in which a UE selects transmission resources directly from a preconfigured resource area or a resource area indicated by the eNB is referred to as Type 1.

In V2X, sidelink transmission mode 3 based on centralized scheduling and sidelink transmission mode 4 based on distributed scheduling are available.

Figure 9:
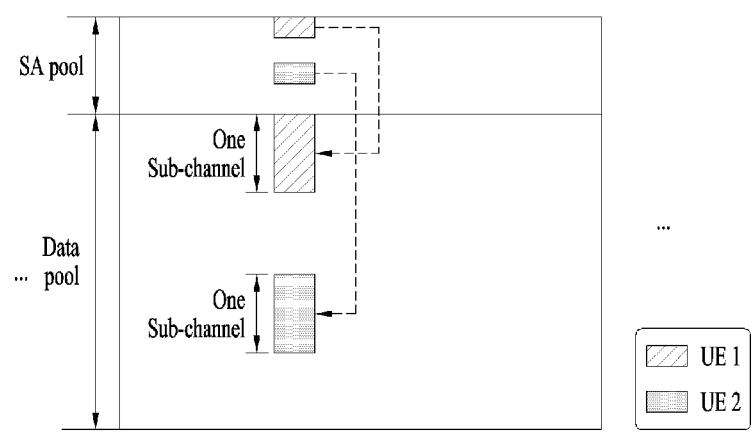
FIG. 9 illustrates PSCCH transmission in sidelink vehicle-to-everything (V2X) communication.
Figure 9:
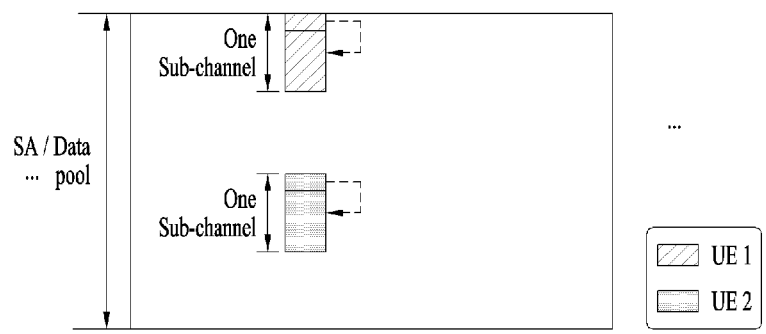

FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b).

Figure 7:
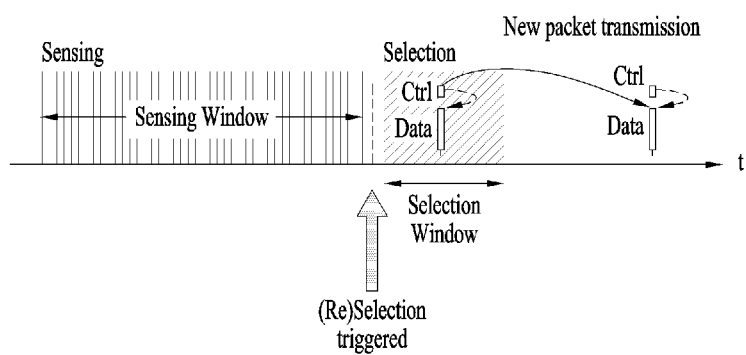
FIG. 7 is a view illustrating a method of selecting resources in sidelink.

In this case, when the transmission resources are selected, transmission resources for a next packet are also reserved as illustrated in FIG. 7. In V2X, transmission is performed twice for each MAC PDU. When resources for initial transmission are selected, resources for retransmission are also reserved with a predetermined time gap from the resources for the initial transmission. The UE may identify transmission resources reserved or used by other UEs through sensing in a sensing window, exclude the transmission resources from a selection window, and randomly select resources with less interference from among the remaining resources.

For example, the UE may decode a PSCCH including information about the cycle of reserved resources within the sensing window and measure PSSCH RSRP on periodic resources determined based on the PSCCH. The UE may exclude resources with PSCCH RSRP more than a threshold from the selection window. Thereafter, the UE may randomly select sidelink resources from the remaining resources in the selection window.

Alternatively, the UE may measure received signal strength indication (RSSI) for the periodic resources in the sensing window and identify resources with less interference, for example, the bottom 20 percent. After selecting resources included in the selection window from among the periodic resources, the UE may randomly select sidelink resources from among the resources included in the selection window. For example, when PSCCH decoding fails, the above method may be applied.

The details thereof may be found in clause 14 of 3GPP TS 3GPP TS 36.213 V14.6.0, which are incorporated herein by reference.

Transmission and Reception of PSCCH

A UE in sidelink transmission mode 1 may transmit a PSCCH (a sidelink signal or sidelink control information (SCI)) in resources configured by an eNB. A UE in sidelink transmission mode 2 may be configured with resources for sidelink transmission by the eNB, select time and frequency resources from among the configured resources, and transmit a PSCCH in the selected time and frequency resources.

In sidelink transmission mode 1 or 2, a PSCCH period may be defined as illustrated in FIG. 8.

Referring to FIG. 8, a first PSCCH (or a scheduling assignment, SA) period may start in a subframe spaced from a specific system frame by a specific offset indicated by higher-layer signaling. Each PSCCH period may include a PSCCH resource pool and a subframe pool for sidelink data transmission. The PSCCH resource pool may include the first subframe of the PSCCH period to the last of subframes indicated as carrying a PSCCH by a subframe bitmap, saSubframeBitmap. The resource pool for sidelink data transmission may include subframes determined by a time-resource pattern for transmission (T-RPT) (or a time-resource pattern (TRP)) in mode 1. As illustrated, when the number of subframes included in the PSCCH period except for the PSCCH resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to 1s in a T-RPT bitmap, and one MAC PDU is transmitted four times.

Unlike sidelink, an SA (PSCCH) and data (PSSCH) are transmitted in FDM in V2X, that is, sidelink transmission mode 3 or 4. Because latency reduction is a significant factor in V2X in view of the nature of vehicle communication, a PSCCH and data are transmitted in FDM in different frequency resources of the same time resources. Examples of this transmission scheme are illustrated in FIG. 9. A PSCCH and data may not be contiguous to each other as illustrated in FIG. 9(a) or may be contiguous to each other as illustrated in FIG. 9(b). Herein, a basic transmission unit is a subchannel A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

Sidelink Congestion Control

A sidelink radio communication environment may easily become congested according to increases in the density of vehicles, the amount of information transfer, etc. Various methods are applicable for congestion reduction. For example, distributed congestion control may be applied.

In the distributed congestion control, a UE understands the congestion level of a network and performs transmission control. In this case, the congestion control needs to be performed in consideration of the priorities of traffic (e.g., packets).

Specifically, each UE may measure a channel busy ratio (CBR) and then determine the maximum value (CRlimitk) of a channel occupancy ratio (CRk) that may be occupied by each traffic priority (e.g., k) according to the CBR. For example, the UE may calculate the maximum value (CRlimitk) of the channel occupancy ratio for each traffic priority based on CBR measurement values and a predetermined table. If traffic has a higher priority, the maximum value of the channel occupancy ratio may increase.

The UE may perform the congestion control as follows. The UE may limit the sum of the channel occupancy ratios of traffic with a priority k such that the sum does not exceed a predetermined value, where k is less than i. According to this method, the channel occupancy ratios of traffic with low priorities are further restricted.

Besides, the UE may use methods such as control of the magnitude of transmission power, packet drop, determination of retransmission or non-retransmission, and control of the size of a transmission RB (MCS adjustment).

5G Use Cases

Three key requirement areas of 5G (e.g., NR) include (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple 5G use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans may not achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

Embodiments

The present disclosure proposes a method of configuring the length of a sidelink CP in consideration of millimeter wave (mmWave) vehicle-to-everything (V2X) communication environments.

In conventional sidelink transmission, a plurality of UEs synchronize with a common synchronization reference and perform transmission on different frequency resources. Here, the synchronization reference may be, for example, a satellite signal such as a global navigation satellite system (GNSS) signal or a synchronization signal transmitted by a BS. As another example, the synchronization reference may be a sidelink synchronization signal (SLSS) transmitted by another UE in sidelink. In this situation, the following case may be considered ideal. Each UE starts transmission based on a symbol boundary derived from the common reference, and a receiving UE (RX UE) also configures a receiver (RX) window based on the symbol boundary and performs a fast Fourier transform (FFT) in order to extract (decode) signal(s) transmitted by UE(s) on each frequency resource.

However, in real communication environments, since there is a propagation delay from a transmitting (TX) UE to the RX UE, the RX UE should receive a signal from the TX UE at a time different from the symbol boundary derived from the synchronization reference. In addition, the arrival time of a signal transmitted from each TX UE may also be different. The arrival time of the signal transmitted from each TX UE may vary depending on the distance between each TX UE and the RX UE. This is because the propagation delay varies depending on the distance between the TX and RX UEs. However, regarding such a transmission/reception timing error, if the value thereof is within a CP with respect to the RX window of the RX UE, it is possible to successfully decode each received signal through the FFT or orthogonally separate signals transmitted from different UEs.

However, if the length of the CP is shortened, the arrival-time error(s) of received signal(s) are not within the CP from the perspective of the RX UE. In this case, if the RX window is configured according to the conventional method and decoding is performed through the FFT, the performance of the corresponding RX UE may degraded.

Considering a shortened transmission time interval (TTI) discussed in NR, the sidelink CP length may also be shortened in mmWave bands. Compared to a channel/signal having a relatively long CP length in a low frequency band, when the CP length is shortened, even if the TX UE transmits a channel/signal in accordance with the common synchronization reference, the RX UE may have a case where the arrival time errors of received signals are not within the CP. In this case, if the RX UE configures the RX window according to the conventional method and perform decoding through the FFT, the performance of the corresponding RX UE may degraded. That is, all desired signals may not be included in the RX window configured by the RX UE. Specifically, undesired signals (e.g., inter-symbol interference (ISI)) may be received, or orthogonality may not be guaranteed between frequency division multiplexed (FDMed) channels (for example. inter-channel interference or inter-carrier interference (ICS) may occur).

Figure 10:
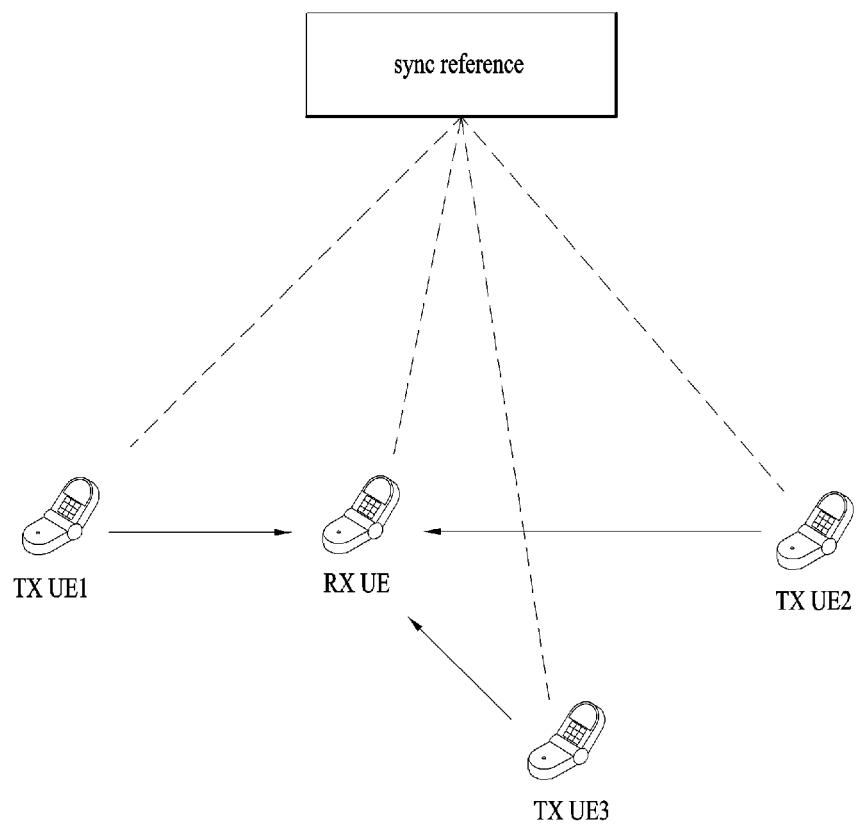
FIG. 10 is a diagram illustrating a system in which transmitting/receiving user equipments (UEs) are synchronized with a synchronization reference and exchange signals with each other
Figure 11:
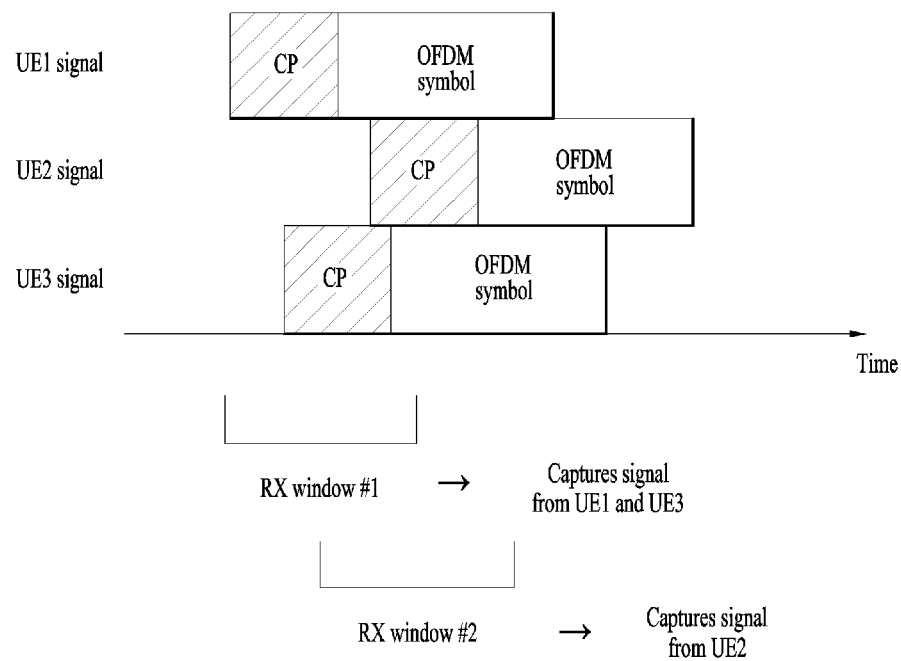
FIG. 11 is a diagram illustrating an example related to the present disclosure.

Referring to FIGS. 10 and 11, since TX UE1 and TX UE3 have almost the same distance to the RX UE, even if FFT decoding is performed based on a single RX window (e.g., RX window #1 shown in FIG. 11), signal decoding may be successful because the arrival time difference between received signals is within a CP. Referring to FIG. 11, it may be seen that the arrival times of a UE1 signal and a UE3 signal are different due to propagation delays but the CP of the UE1 signal and the CP of the UE3 signal are both within the range of RX window #1. Accordingly, the CP of the UE1 signal and the CP of the UE3 signal of FIG. 11 may be decoded through RX window #1.

However, in the case of TX UE2 with a significant difference in distance to the RX UE compared to TX UE1 and TX UE3, when FFT decoding is performed based on RX window #1, reception performance may be degraded due to ICI/ISI (see FIGS. 10 and 11). Also, referring to FIG. 11, it may be seen that a UE2 signal is received later due to a larger propagation delay than in those of the UE1 signal and UE3 signal and a part of the CP of the received UE2 signal is out of the range of RX window #1. For this reason, when the RX UE attempts to decode the UE2 signal using RX window #1, the decoding may fail.

Figure 12:
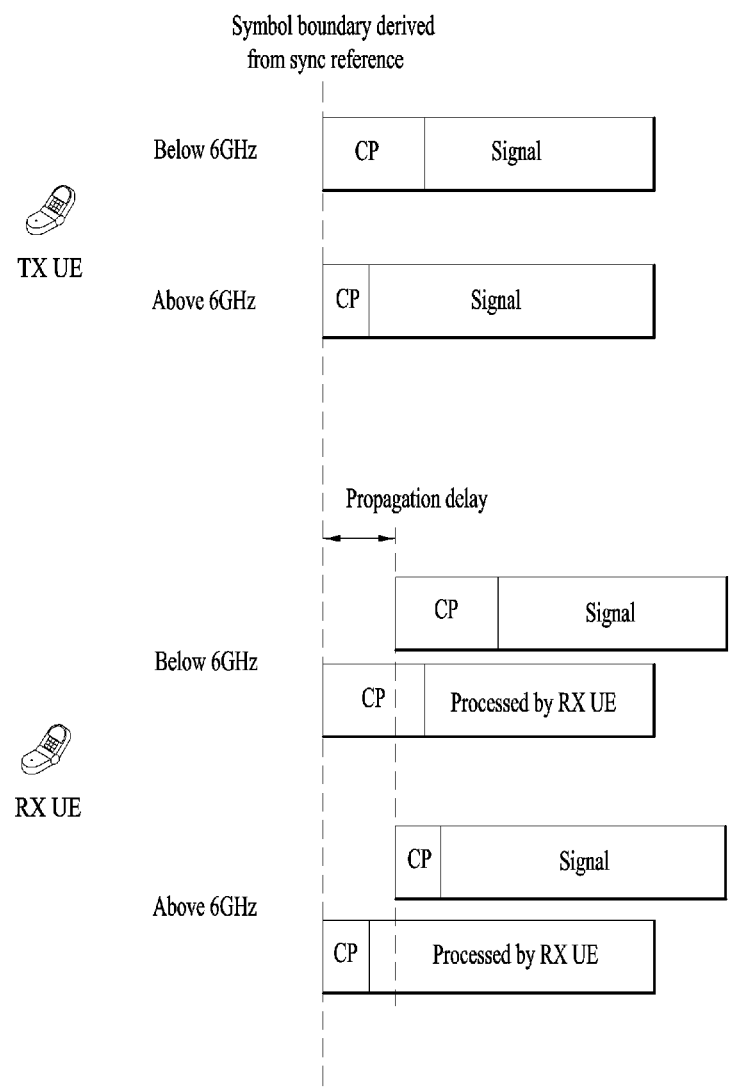
FIG. 12 is a diagram illustrating an example related to the present disclosure.
Figure 13:
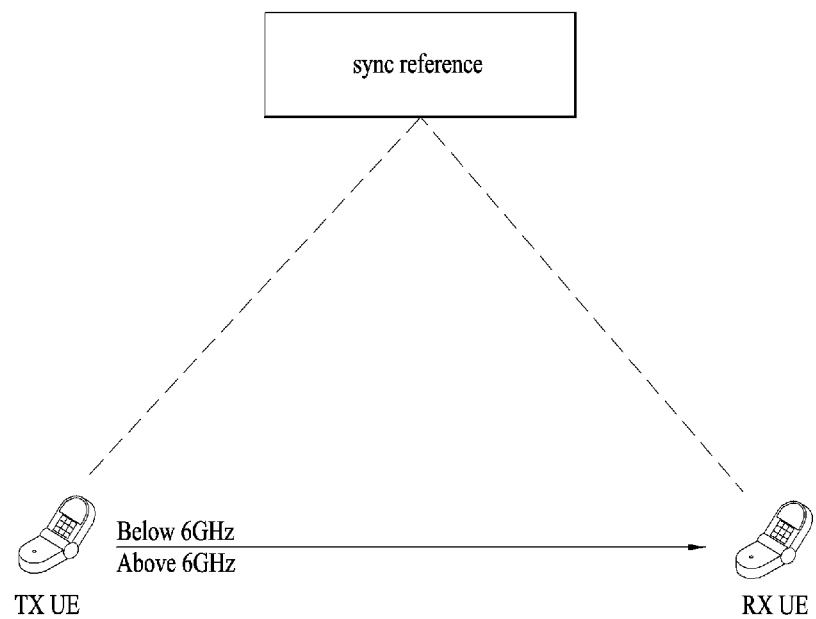
FIG. 13 illustrates communication between UEs operating on a plurality of frequency bands in synchronization with a common synchronization reference.

On the other hand, when a single TX UE transmits channels/signals/carriers/resource pools/BWPs having different CP lengths in synchronization with a common synchronization reference as shown in FIGS. 12 and 13, the aforementioned case where the arrival time errors of received channels/signals are not within the CP from the perspective of the RX UE may also occur. The reason why channels/signals/carriers/resource pools/BWPs have different CP lengths may be due to: i) different subcarrier spacings; ii) different CP types; or iii) both different subcarrier spacings and different CP types.

Specifically, in FIG. 12, it is assumed that the TX UE transmits a channel/signal having a relatively long CP length in a band below 6 GHz and transmits a channel/signal having a relatively short CP length in a band above 6 GHz. In this case, the channel/signal transmitted in the band below 6 GHz and the channel/signal/carrier/resource pool/BWP transmitted in the band above 6 GHz may experience the same propagation delay (or almost similar propagation delays) and then be received by the RX UE. Even if the RX UE receives the signals with the same propagation delay (or almost similar propagation delays), the RX UE may have no problems in configuring the RX window for the channel/signal with the relatively long CP (i.e., the channel/signal transmitted in the band below 6 GHz of FIG. 12) and decoding the corresponding channel/signal because the arrival time error of the channel/signal is within the CP. However, for the channel/signal with the relatively short CP length (i.e., the channel/signal transmitted in the band above 6 GHz of FIG. 12), if the RX UE configures the RX window based on the same timing synchronization as that used for the band below 6 GHz and decodes the corresponding channel/signal, the reception performance of the RX UE may be degraded due to ICI/ISI.

Accordingly, the present disclosure proposes a method for solving a problem that the propagation delay between TX and RX UEs is not covered due to a short CP length and the decoding performance of the RX UE is degraded in mmWave sidelink. Hereinafter, the present disclosure describes a method of adjusting the CP length of a channel/signal to be transmitted from the TX UE in a band above 6 GHz based on the distance between the TX and RX UEs obtained from a channel/signal received in a band below 6 GHz.

Considering a decrease in the TTI discussed in NR (or an increase in subcarrier spacing), the sidelink CP length may be inevitably shortened in mmWave bands. From the perspective of the RX UE, when the CP length is shortened, the arrival time error(s) of received signal(s) may not be within the CP. Nevertheless, if the RX UE configures the RX window according to the conventional method and performs decoding based on the FFT, the performance of the corresponding RX UE may be degraded. Accordingly, the present disclosure proposes a method for avoiding the performance degradation of the RX UE.

FIG. 13 illustrates an example of communication between UEs operating a plurality of frequency bands in accordance with a common synchronization reference.

Figure 14:
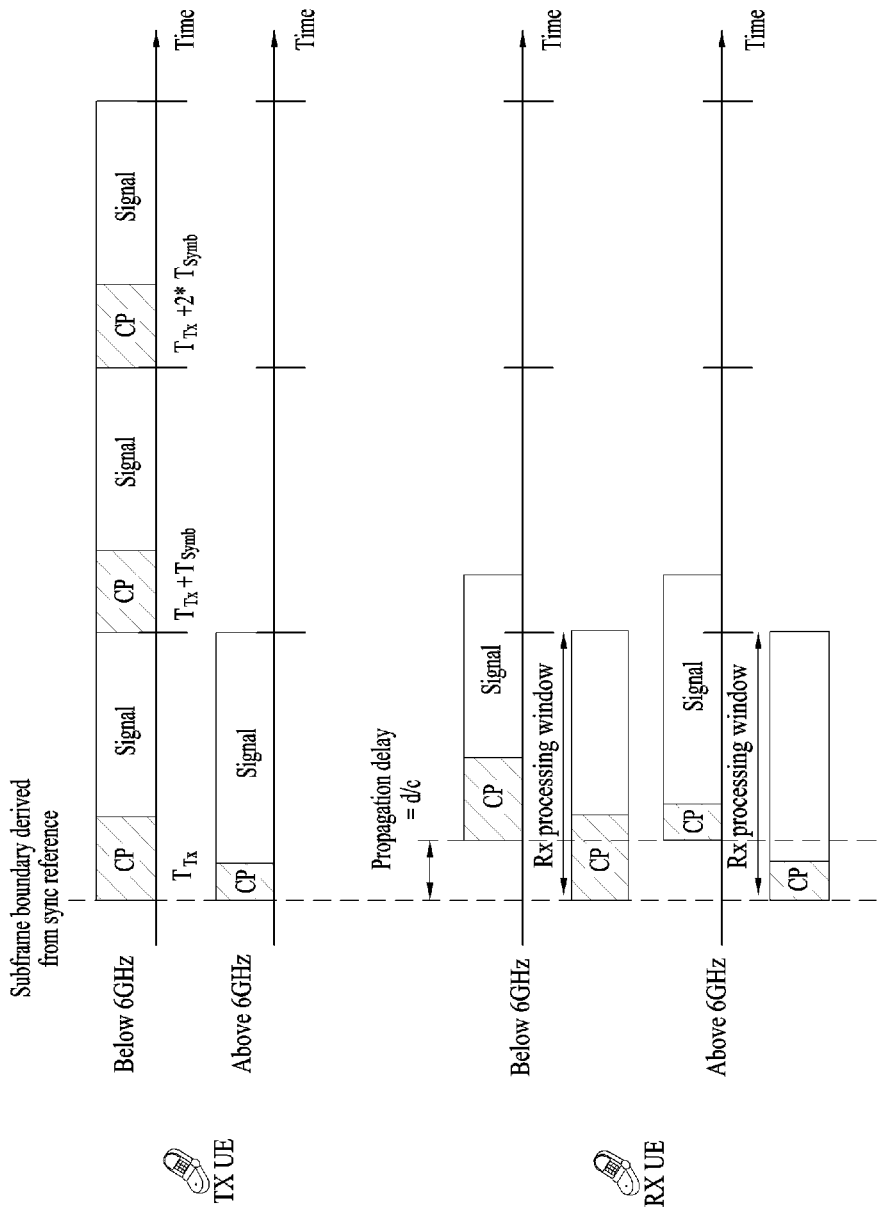
FIG. 14 illustrates the occurrence of a propagation delay due to a short cyclic prefix (CP) length.
Figure 15:
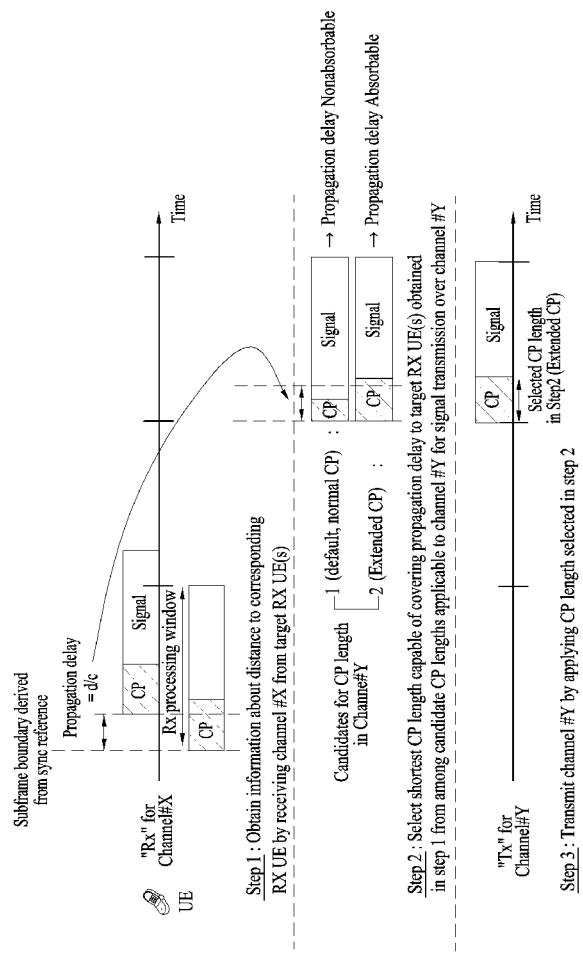
FIG. 15 is a diagram illustrating an example related to the present disclosure.

FIG. 14 illustrates an example in which a propagation delay occurs due to a short CP length.

Even when a single TX UE transmits channels/signals having different CP lengths in synchronization with a common synchronization reference as shown in FIGS. 13 and 14, the aforementioned case where the arrival time errors of received channels/signals are not within the CP from the perspective of the RX UE may occur. The reason that channels/signals/carriers/resource pools/BWPs have different CP lengths may be due to: i) different subcarrier spacings; ii) different CP types; or iii) both different subcarrier spacings and different CP types.

For convenience of explanation, FIGS. 13 and 14 show that channels/signals having different CP lengths transmitted in synchronization with a common synchronization reference are classified by carriers as follows: a channel/signal transmitted on a carrier above 6 GHz and a channel/signal transmitted on a carrier below 6 GHz. However, the present disclosure is not limited thereto. That is, a similar situation may occur in any case where channels/signals having different CP lengths are transmitted and received based on the same synchronization reference.

According to an embodiment of the present disclosure, the TX UE may transmit a channel/signal having a relatively long CP length in a band below 6 GHz and transmit a channel/signal having a relatively short CP in a band above 6 GHz as shown in FIG. 14. Here, two transport carriers may have different CP lengths due to the following reasons: (i) the two transport carriers have different subcarrier spacings (SCSs); (ii) different CP types are set/configured as follows: a normal CP is set/configured for one carrier and an extended CP is set/configured for the other carrier has an extended CP; or (iii) both reasons (i) and (ii) are combined. Regarding reason (ii), a channel/signal/carrier/resource pool/BWP having a relatively long CP length may be a channel/signal with a CP type including the normal and extended CPs, and a channel/signal having a relatively short CP length may be a channel/signal with a CP type including only the normal CP. In this case, the channel/signal transmitted in the band below 6 GHz and the channel/signal/carrier/resource pool/BWP transmitted in the band above 6 GHz may experience the same propagation delay (or almost similar propagation delays) and then be received by the RX UE. Even if the RX UE receives the signals with the same propagation delay (or almost similar propagation delays) on the two transport carriers, the RX UE may successfully configure the RX window for the channel/signal/carrier/resource pool/BWP with the relatively long CP (i.e., the channel/signal transmitted in the band below 6 GHz of FIG. 14) and successfully decode the corresponding channel/signal/carrier/resource pool/BWP because the arrival time error of the channel/signal/carrier/resource pool/BWP is within the CP. However, for the channel/signal with the relatively short CP (i.e., the channel/signal transmitted in the band above 6 GHz of FIG. 14), if the RX UE configures the RX window based on the same timing synchronization as that used for the band below 6 GHz and decodes the corresponding channel/signal based on the RX window, the reception performance of the RX UE may be degraded because the arrival time error of the channel/signal is not within the CP. On the other hand, a long CP may include all of the following cases: when the CP itself is long, when a CP type with a relatively long CP length is configured (e.g., extended CP), and when the ratio of the CP to the SCS is large. The reason that two transport carriers/resource pools/BWPs/channels/signals have different CP lengths may be as follows: the two transport carriers/resource pools/BWPs/channels/signals have different SCSs; the normal CP is configured for one transport carrier/resource pool/BWP/channel/signal and the extended CP is configured for the other transport carrier/resource pool/BWP/channel/signal, or the above two reasons are combined.

For a channel/signal with a relatively short CP, the present disclosure proposes the following methods: (1) the TX UE adjusts its transmission timing; (2) the RX UE adjusts an FFT window boundary timing so that the arrival time error of the channel/signal is within the CP; or (3) the TX UE selects/controls/changes/determines/adjusts the CP length (or CP type) according to the propagation delay (so that the propagation delay is covered by the CP length) and transmits a signal on/in a carrier/resource pool/BWP/channel where the corresponding CP length is configured. Here, the selection (or control/change/determination/adjustment) of the CP length may include: i) directly selecting (or controlling/changing/determining/adjusting) the CP length itself for a specific (given/allocated/signaled) carrier/resource pool/BWP/channel; or ii) not only selecting (or controlling/changing/determining/adjusting) the CP length but also selecting (or controlling/changing/determining/adjusting) transmission and reception on/in a carrier/resource pool/BWP/channel where the corresponding CP length is configured. In addition, the adjustment of the CP length may include an operation/process of selecting (or controlling/changing/determining) the CP type (e.g., normal CP, extended CP, etc.) and/or SCS, which may be interpreted as an operation/process of selecting (or controlling/changing/determining) a numerology to be used for transmission.

To prevent and/or minimize a case in which the entirety of a propagation delay is not covered due to a decrease in the CP length in V2X communication using mmWave bands, the present disclosure proposes a method by which the TX UE receives information about the distance to the RX UE (and/or location information) from the RX UE and/or BS and selects/configures candidate resources (e.g., CP length, SCS, etc.) for signal transmission/reception based on the received information. For example, the method may include that the TX UE acquires information about the distance between the TX and RX UEs through signaling performed on a band below 6 GHz and selects/configures a numerology to be applied to signal transmission on a band above 6 GHz and/or a candidate transmission resource (e.g., carrier, resource pool, BWP, etc.) where the corresponding numerology is configured. For example, the method may include: an operation/step in which the RX UE selects a numerology or a candidate transmission resource where the selected numerology is configured and then indicates/recommends to the TX UE control information on the selected numerology or candidate transmission resource where the selected numerology is configured; and/or an operation/step in which the TX UE transmits to the RX UE a confirm message indicating that the TX UE will follow the indication/recommendation (or not) based on the above-described control information. As another example, the method may include: an operation/step in which the RX UE selects a numerology or a candidate transmission resource where the selected numerology is configured and then indicates/recommends to the TX UE control information on the selected numerology or candidate transmission resource where the selected numerology is configured; and/or an operation/step in which the RX UE indicates/recommends a plurality of candidate numerologies and candidate transmission resources where the plurality of numerology candidates are configured and the TX UE selects one or some of the candidate numerologies and feeds back to the RX UE information about the selected numerologies or candidate transmission resources where the selected numerologies are configured. Here, the numerology may include an SCS, a CP length, and a slot/mini-slot duration. Further, the numerology may refer to an SCS and/or a CP type.

A carrier (channel, signal, resource pool, or BWP) transmitted in a band below 6 GHz may have a CP longer than a timing error in consideration of propagation delays of all target RX UEs that receive the carrier (channel, signal, resource pool, or BWP) to ensure the coverage thereof.

A carrier (channel, signal, resource pool, or BWP) transmitted in a band below 6 GHz may be interpreted to have a relatively longer CP than a carrier (channel, signal, resource pool, or BWP) transmitted in a band above 6 GHz. When a long CP is configured, it may include all the following cases: when the extended CP having a relatively long CP length among the normal CP and extended CP is configured by the CP type; when a large SCS is configured; or when both a large SCS and a CP type having a long CP length are configured. In this case, the SCS of a carrier (channel, signal, resource pool, or BWP) transmitted in a band below 6 GHz may be different from the SCS of a carrier (channel, signal, resource pool, or BWP) transmitted in a band above 6 GHz. Alternatively, the SCS of a carrier (channel, signal, resource pool, or BWP) transmitted in a band below 6 GHz may be the same as the SCS of a carrier (channel, signal, resource pool, or BWP) transmitted in a band above 6 GHz.

Two or more carriers (channels, signals, resource pools, or BWPs) with different CP lengths may be transmitted from a single UE in accordance with the same synchronization reference. A carrier (channel, signal, resource pool, or BWP) corresponding to a reference for deriving the subframe boundary is defined as an anchor carrier (anchor channel, anchor signal, anchor resource pool, or anchor BWP). Here, the reference for deriving the subframe boundary may be determined based on a time point at which an SLSS is transmitted and received.

In addition, a carrier (channel, signal, resource pool, or BWP) in which SLSS transmission and reception is performed may be interpreted as the anchor carrier (anchor channel, anchor signal, anchor resource pool, or anchor BWP). For example, a 5.9 GHz-band carrier in which SLSS transmission and reception is performed may become the anchor carrier, and a carrier on 6 GHz band or higher having a relatively short CP length in which data transmission is performed may follow the timing synchronization derived from the anchor carrier.

A carrier (channel, signal, resource pool, or BWP) sharing the timing synchronization derived from the anchor carrier may be: 1) a carrier (channel, signal, resource pool, or BWP) having a relatively short CP length compared to the anchor carrier (channel, signal, resource pool, or BWP); 2) a carrier (channel, signal, resource pool, or BWP) transmitted on a high frequency band compared to the anchor carrier (channel, signal, resource pool, or BWP); and/or 3) a channel/ signal for data transmission (e.g., PSSCH) and/or a channel/signal for control information transmission (e.g., PSCCH).

To prevent and/or minimize a case in which the entirety of a propagation delay is not covered due to a decrease in the CP length in V2X communication using mmWave bands, the TX UE may obtain/calculate information about the distance between the TX and RX UEs from signaling performed on a band below 6 GHz and adjust a CP type, SCS, and/or a numerology to be applied to signal transmission in a band above 6 GHz based on the obtained distance information (so that the propagation delay is covered).

For convenience of description, the following may be assumed.

A UE having information to transmit over channel #Y is defined as the TX UE, and a UE having information to receive over channel #X is defined as the RX UE.

The anchor carrier of channel #Y is a carrier on which channel #X is transmitted.

For example, channel #Y may be considered as a frequency resource (channel) transmitted in a relatively higher frequency band than channel #X. For example, channel #Y may be a signal transmitted in a 63 GHz band, and channel #X may be a signal transmitted in a 5.9 GHz band.

As another example, channel #X and channel #Y may be different channels or signals (particularly, channel #X and channel #Y may be channels/signals transmitted in the same/adjacent/different frequency bands). For example, channel #X may be a channel carrying control information (e.g., PSCCH) or a channel carrying discovery messages, and channel #Y may be a channel carrying data (e.g., PSSCH) or a channel carrying both control information and data channels (e.g., PSCCH and/or PSSCH).

As a further example, channel #X and channel #Y may be channels transmitted on resources of carriers/resource pools/BWPs where different numerologies are configured (for example, different SCSs, different CP types (e.g., normal and extended CPs) in the case of the same SCS, or different SCSs and different CP lengths may be configured).

Figure 16:
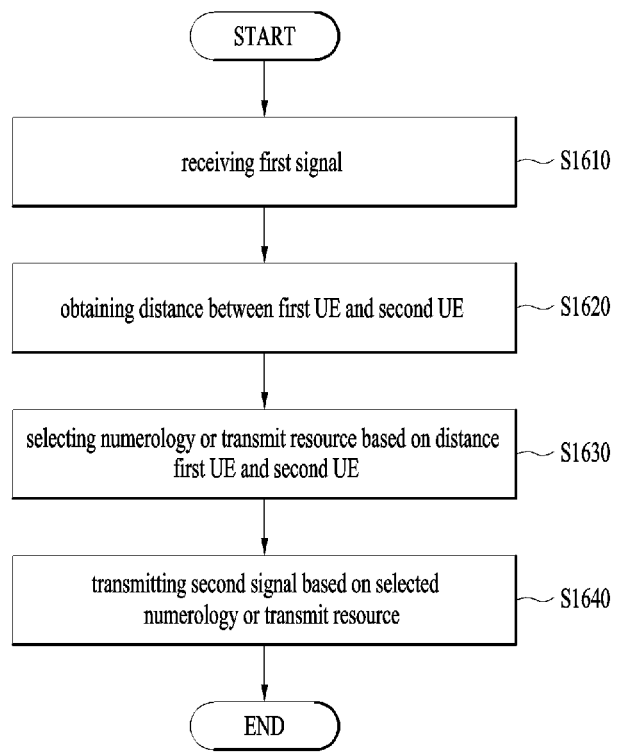
FIG. 16 is a flowchart illustrating an embodiment of the present disclosure.

FIG. 16 is a flowchart illustrating an embodiment of the present disclosure.

In an embodiment of the present disclosure, a method of transmitting a signal by a first UE (TX UE) to a second UE (RX UE) in a wireless communication system is provided. The method may include: receiving, by the first UE, control information from the second UE; selecting, by the first UE, a candidate resource based on the received control information; and transmitting, by the first UE, the signal to the second UE on the selected candidate resource. Specifically, referring to FIG. 16, the method of transmitting the signal by the first UE (TX UE) to the second UE (RX UE) in the wireless communication system may include: obtaining, by the first UE, a distance between the first and second UEs based on a received first signal (S1620); selecting a numerology for transmission of a second signal or a transmission resource in which the numerology is configured based on the obtained distance (S1630); and transmitting, by the first UE, the second signal to the second UE based on the selected numerology or transmission resource (S1640). Here, the numerology may refer to an SCS and/or a CP type, and the transmission resource may be a transmission resource in which a numerology suitable for the second signal is configured and include a carrier/resource pool/BWP.

For example, the selection (S1630) of FIG. 16 may include: an operation/step in which an operation/step in which the RX UE selects a numerology or a candidate transmission resource where the selected numerology is configured and then indicates/recommends to the TX UE control information on the selected numerology or candidate transmission resource where the selected numerology is configured; and/or an operation/step in which the TX UE transmits to the RX UE a confirm message indicating that the TX UE will follow the indication/recommendation (or not) based on the above-described control information. As another example, the selection (S1630) of FIG. 16 may include: an operation/step in which the RX UE selects a numerology or a candidate transmission resource where the selected numerology is configured and then indicates/recommends to the TX UE control information on the selected numerology or candidate transmission resource where the selected numerology is configured; and/or an operation/step in which the RX UE indicates/recommends a plurality of candidate numerologies and candidate transmission resources where the plurality of numerology candidates are configured and the TX UE selects one or some of the candidate numerologies and feeds back to the RX UE information about the selected numerologies or candidate transmission resources where the selected numerologies are configured.

Figure 17:
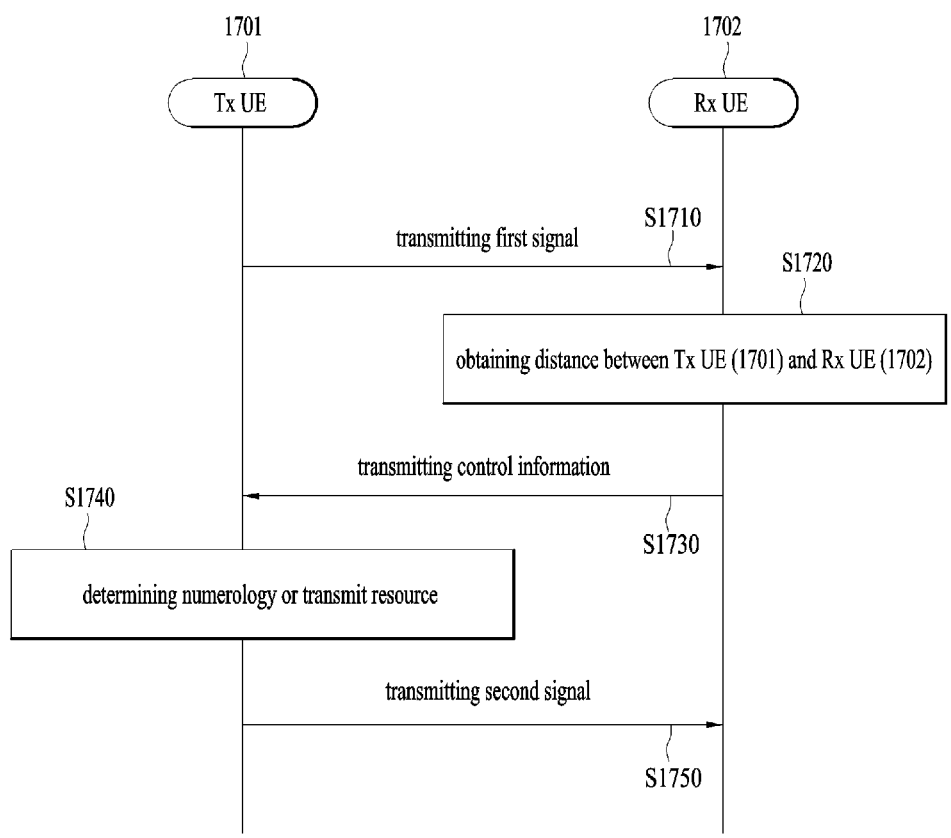
FIG. 17 is a flowchart illustrating an embodiment of the present disclosure.

FIG. 17 is a flowchart illustrating an embodiment of the present disclosure.

In an embodiment of the present disclosure, a method of transmitting a signal by a TX UE 1701 to an RX UE 1702 in a wireless communication system is provided. The method may include: transmitting, by the TX UE 1701, a first signal to the RX UE 1702 (S1710); obtaining (calculating), by the RX UE 1702, a distance between the TX UE 1701 and the RX UE 1702 based on the received first signal (S1720); transmitting, by the RX UE 1702, control information including information about the distance between the TX UE 1701 and the RX UE 1702 to the TX UE 1701 (S1730); determining/selecting, by the TX UE 1701, a numerology for transmission of a second signal or a transmission resource (e.g., SCS and/or CP length) in which the numerology is configured based on the received control information; and transmitting, by the TX UE 1701, the second signal to RX UE 1702 based on the determined/selected numerology or transmission resource.

In addition, an embodiment of the present disclosure may include at least one of step 1, step 2, or step 3 below.

(Step 1) The TX UE may receive control information. For example, the TX UE may receive channel #X transmitted by target RX UE(s) on a relatively low frequency band and obtain distance information between the TX UE and target RX UE(s) by receiving channel #X.

(Step 2) The TX UE may select/determine a candidate resource based on the received control information. For example, the TX UE may select the shortest CP length capable of covering a propagation delay that may occur due to the distance to the target RX UE(s) obtained in step 1 from among a plurality of candidate CP lengths applicable to transmission of channel #Y at the TX UE. Here, selecting the shortest CP length may mean: 1) selecting a numerology, SCS and/or CP type having the shortest CP length; or 2) selecting a channel/signal/carrier/resource pool/BWP in which the above-described numerology is configured.

(Step 3) The TX UE may transmit a signal to the RX UE on the selected/determined candidate resource. For example, the TX UE may transmit channel #Y by applying the CP length selected in step 2 thereto.

Regarding step 1, the following is proposed in an embodiment of the present disclosure.

The TX UE may receive the control information from the RX UE and/or BS. The control information may include information about the distance between the TX and RX UEs and information about the location of the TX and/or RX UE. The control information may be received in a first frequency region. For example, the first frequency region may be a frequency region including frequencies lower than those in a second frequency region, which will be described later regarding step 3. As another example, the first frequency region may mean below 6 GHz (or below 5.9 GHz) or sub-6 GHz (or sub-5.9 GHz), and the second frequency region may mean above 6 GHz (or above 5.9 GHz). However, a frequency value that distinguishes the first and second frequency regions is merely exemplary (that is, the present disclosure is not limited thereto). The first and second frequency regions may be distinguished based on other frequency values. As a further example, one of the first and second frequency regions may include a frequency at which a synchronization signal (e.g., SLSS) is transmitted, and the other may include a frequency at which no synchronization signals are transmitted.

For example, upon receiving channel #X (i.e., a channel transmitted in a band below 6 GHz), the TX UE may obtain information about distance(s) from the TX UE to target RX UE(s) according to any one of the following examples or any combination thereof.

The UE may calculate the distance between the TX and RX UEs from information about the locations of target receivers included in a cooperative awareness message/basic safety message (CAM/BSM) on a band below 6 GHz. For example, control information may include at least one of the CAM and BSM. In addition, the CAM and/or BSM may be a message broadcast by the TX UE to unspecified UEs.

Distance information between the TX UE and target RX UE(s) may be estimated from a time at which channel #X has been received in the band below 6 GHz. The RX UE may transmit to the TX UE the distance information estimated from the reception time. For example, the TX UE may transmit a preamble/sequence, a synchronization signal (e.g., SLSS), a control message for scheduling data transmission, and/or a reference signal therefor on channel #X and/or in a signal on the band below 6 GHz (before packet transmission). The RX UE may calculate/estimate the distance between the TX and RX UEs based on preamble/sequence detection (when the correlation value/received signal strength is more than or equal to a predetermined threshold) and/or received signal quality/measurement values (e.g., RSRP, pathloss, etc.) and then transmit information about the calculated/estimated distance to the TX UE. For example, according to an embodiment of the present disclosure, the distance between a first UE (e.g. TX UE) and a second UE (e.g., target RX UE) may be calculated by the second UE based on at least any one of the signal strength of a first signal and the channel quality between the first and second UEs. In this case, the first UE may receive, from the second UE, the first signal including information about the distance calculated by the second UE and obtain (confirm) the distance from the first UE to the second UE based on the received distance information.

On the assumption that a signal on a band above 6 GHz (e.g., channel #Y) is already determined between the TX UE and RX UE(s), each RX UE may transmit to the TX UE information about the distance from each RX UE to the TX UE estimated from a time at which each RX UE has been received channel #X in the band below 6 GHz.

After calculating the distance from each RX UE to the TX UE based on the time at which each RX UE has been received channel #X in the band below 6 GHz on the assumption that the signal on the band above 6 GHz (e g, channel #Y) is already determined between the TX UE and RX UE(s), each RX UE may select a candidate resource (e.g., SCS and/or CP length) capable of covering a propagation delay that may occur due to the corresponding distance (distance between the TX and RX UEs) and then transmit to the TX UE the selected candidate resource (e.g., SCS and/or CP length) over channel #X.

Regarding step 2, the following is proposed in an embodiment of the present disclosure.

The TX UE may select/determine the candidate resource based on the control information received in step 1. For example, parameters adjustable by the TX UE based on the information obtained in step 1 may include a CP type (e.g., normal CP or extended CP), an SCS, and both the CP type and SCS.

In NR, a single numerology may be configured for a single BWP, and numerology change may require BWP switching. That is, multiple numerologies may not be used for a single BWP. In addition, ICI may occur if there are a plurality of signals with different CP lengths in a carrier (channel, signal, resource pool, or BWP). Here, the ICI refers to inter-carrier interference. Therefore, different CP lengths and/or different SCSs may be configured for different carriers (channels, signals, resource pools, or BWPs), and the selection of the candidate resource (e.g., SCS and/or CP length) in step 2 and step 3 may be interpreted as selecting a carrier (channel, signal, resource pool, or BWP) for transmitting a signal in a band above 6 GHz (e.g., channel #X).

To determine the candidate resource (e.g., SCS and/or CP type) based on the information obtained in step 1, the TX UE may use the following methods and criteria.

For example, in unicast communication, if the TX UE is capable of changing only the CP length without changing the SCS (the SCS may not be allowed to change), the TX UE may select the shortest CP length from among candidate CP lengths capable of covering a propagation delay from a corresponding RX UE. As another example, if the TX UE is capable of changing/selecting the SCS and CP length, the TX UE may select a suitable candidate resource (e.g., SCS and/or CP length) from among combinations of candidate resources (e.g., SCSs and/or CP lengths) capable of covering the propagation delay from the corresponding RX UE in consideration of UE movement speeds, etc.

In multicast communication, the TX UE may select a candidate resource (e.g., SCS and/or CP length) having a CP length capable of covering a propagation delay from the corresponding RX UE with respect to the farthest RX UE among target receivers. In addition, target RX UEs may be grouped based on distances between the TX UE and RX UEs, and a different candidate resource (e.g., SCS and/or CP length) may be applied for each RX UE group. For example, if the TX UE supports two CP lengths: normal CP length and extended CP length on the assumption of an SCS of 60 kHz, the TX UE may divide target RX UEs in two groups: RX UEs having propagation delays covered by the normal CP length (i.e., RX UEs located relatively close to the TX UE); and RX UEs having propagation delays non-covered by the normal CP length (i.e., RX UEs located relatively distant from the TX UE). The TX UE may perform data transmission on different time and/or frequency resources (e.g., carrier/resource pool/BWP/signal/channel, etc.) by applying a different CP length to each RX UE group. In this case, a power control method of transmitting a signal with a relatively short CP length (e.g., normal CP) at relatively small transmission power and transmitting a signal with a relatively long CP length (e.g., extended CP) at relatively high transmission power may be considered.

Considering at least the following factors, the CP length and/or transmission power suitable for V2X message transmission may not be the same (at all times). For example, when a message requiring a relatively large coverage is transmitted, high transmission power based on a long CP may be suitable. When a message requiring a small coverage is transmitted in a high carrier frequency range/band, high transmission power based on a short CP may be suitable. For example, when synchronization is established based on a UE-type synchronization reference source, (high power) transmission based on a long CP may be suitable in consideration of a relatively large range of (time synchronization) error values (compared to a BS-type synchronization reference source). As an additional example, when packet transmission is performed for services with relatively tight Quality of Service (QoS) requirements, a long CP (and/or high transmission power) may be required to satisfy the QoS requirements. Considering that channel estimation errors increase as the relative or absolute speed increases, high power transmission based on a long CP may be suitable.

In this regard, at least one of the following factors may be considered.

(A) Different channel characteristics for each carrier frequency range/band (for example, even when transmission is performed with the same TX power, the achievable communication coverage may decrease as the frequency band increases.)

(B) Different (QoS) requirements for each service/cast type (e.g., reliability)

(C) Different (time/frequency) synchronization error requirements for each synchronization reference source/reference (for example, the (time/frequency) synchronization accuracy provided by the BS may be higher than that provided by the UE.)

(D) Different Doppler effects per relative or absolute speed (for example, the higher the relative speed between UEs performing SL communication, the higher the channel estimation error due to the Doppler effect)

In summary, the values/ranges of (selectable/available) CP lengths and/or the values/ranges of (maximum allowable) transmission power may be configured pool-specifically by the network/BS for each of the above-described factors: (A), (B), (C), and/or (D). According to an embodiment of the present disclosure, the BS may be configured to transmit to the UE configuration/control information indicating a plurality of candidate numerologies predefined for the above-described factors: (A), (B), (C), and/or (D) and allow the UE to select a numerology/transmission resource based on the configuration/control information, thereby allowing communication between UEs based on the numerology/transmission resource. In addition, the BS may be configured to transmit to the UE configuration/control information indicating the values/ranges of (selectable/available) CP lengths and/or the values/ranges of (maximum allowable) transmission power for each of the above-described factors: (A), (B), (C), and/or (D) (through higher layer signaling (e.g., RRC, SIB, MAC CE) and/or physical layer signaling (e.g., DCI)) and allow the UE to select the value/range of a CP length and/or the value/range of transmission power and perform signal transmission/reception with other UEs. Further, the TX UE (e.g., anchor UE, representative UE, relay UE, etc.) may transmit to the RX UE (e.g., target UE, relay UE, etc.) configuration/control information indicating the values/ranges of (selectable/available) CP lengths and/or the values/ranges of (maximum allowable) transmission power for each of the above-described factors: (A), (B), (C), and/or (D) (through higher layer signaling and/or physical layer signaling (e.g., SCI)).

According to an embodiment of the present disclosure, step 2 may include: an operation/step in which the RX UE selects a numerology or a candidate transmission resource where the selected numerology is configured and then indicates/recommends to the TX UE control information on the selected numerology or candidate transmission resource where the selected numerology is configured; and/or an operation/step in which the TX UE transmits to the RX UE a confirm message indicating that the TX UE will follow the indication/recommendation (or not) based on the above-described control information. As another example, step 2 may include: an operation/step in which the RX UE selects a numerology or a candidate transmission resource where the selected numerology is configured and then indicates/recommends to the TX UE control information on the selected numerology or candidate transmission resource where the selected numerology is configured; and/or an operation/step in which the RX UE indicates/recommends a plurality of candidate numerologies and candidate transmission resources where the plurality of numerology candidates are configured and the TX UE selects one or some of the candidate numerologies and feeds back to the RX UE information about the selected numerologies or candidate transmission resources where the selected numerologies are configured.

Regarding step 3, the following is proposed in an embodiment of the present disclosure.

The TX UE may transmit a signal to the RX UE on a transmission resource (e.g., carrier, resource pool, BWP, SCS, etc.) in which the CP length selected/determined/changed/configured by the TX UE is configured. For example, before transmitting channel #Y in a band above 6 GHz by selecting/determining/changing/configuring the CP length, the TX UE may transmit information about the CP length adjusted/changed by the TX UE (information about the SCS and/or CP type, or information about the carrier/resource pool/BWP in which the CP length (or numerology such as the SCS, CP type, etc.) adjusted/changed by the TX UE is configured) to the (target) RX UE through signaling in a band below 6 GHz.

Alternatively, the information about the CP length adjusted/changed by the TX UE (information about the SCS and/or CP type, or information about the carrier/resource pool/BWP in which the CP length (or numerology such as the SCS, CP type, etc.) adjusted/changed by the TX UE is configured) may be transmitted together with channel #Y in the band above 6 GHz. For example, the information about the CP length adjusted/changed by the TX UE (information about the SCS and/or CP type, or information about the carrier/resource pool/BWP in which the CP length (or numerology such as the SCS, CP type, etc.) adjusted/changed by the TX UE is configured) may be transmitted with a default SCS and/or CP length, which is predetermined between UEs. As another example, the information about the CP length adjusted/changed by the TX UE (information about the SCS and/or CP type, or information about the carrier/resource pool/BWP in which the CP length (or numerology such as the SCS, CP type, etc.) adjusted/changed by the TX UE is configured) may be transmitted with a default SCS and/or CP length, which is configured (or preconfigured) by the network.

It may be considered that the TX UE does not provide information about the adjusted CP length to the RX UE. However, in this case, since the RX UE does not know which CP type (e.g., normal CP, extended CP, etc.) the signal received by the RX UE has, the RX UE may need to attempt FFT operation (or detection) multiple times in consideration of (all) possible multiple CP lengths. For example, the RX UE may need to take computational complexity of performing the FFT operation by excluding the normal CP and then perform the FFT operation again by excluding the extended CP.

Information about the CP length to be adjusted (or changed/reselected/reconfigured), which is transmitted from the TX UE to the RX UE may include: a) an n-bit indicator; b) a direct CP length value; or c) information about a carrier (channel, signal, resource pool, or BWP) for transmitting channel #Y in a band above 6 GHz if a different candidate resource (e.g., SCS and/or CP length) is mapped to each carrier (channel, signal, resource pool, or BWP). For example, referring to FIG. 17, the method according to an embodiment of the present disclosure may further include: a process in which the TX UE 1701 determines a candidate resource (S1740) and then transmit a third signal including information about the candidate resource to the RX UE 1702 before transmitting a second signal (S1750). Upon receiving the third signal, the RX UE 1702 may decode the second signal based on the information on the candidate resource. The third signal may further include bit map information on the candidate resource, and the bit map information may include one-bit information indicating whether the candidate resource is changed.

As described above, the information on the CP length to be adjusted, which is transmitted by the TX UE to the RX UE, may include the n-bit indicator.

For example, the n-bit indicator may indicate that the candidate resource (e.g., SCS and/or CP length) will be changed (or is changed) to be different from the current or previously received signal. In this case, since ON/OFF needs to be indicated by 0 or 1 to inform whether the candidate resource is changed, a one-bit indicator may be sufficient. For example, the control information in S1601 of FIG. 16 may further include one-bit information indicating whether the candidate resource (e.g., SCS and/or CP length) is changed.

As another example, the n-bit indicator may directly indicate the configuration value for a specific candidate resource (e.g., SCS and/or CP length) mapped to a bit combination of the indicator. For example, when two CP lengths: normal CP and extended CP are considered, the CP lengths may be mapped to indicator bits such that the indicator indicates the normal CP if the indicator value (bit value) is 1 and indicates the extended CP if the indicator value (bit value) is 0. When the UE is capable of supporting three or more candidate CP lengths, a mapping relationship may be established between CP lengths predetermined between UEs or configured (or preconfigured) by the network and bit combinations of the n-bit indicator.

As a further example, an indicator indicating all candidate resources (e.g., SCSs and/or CP lengths) may be used. In other words, combinations of various candidate resources (e.g., SCSs and/or CP lengths) may be mapped to bit combinations of the indicator. For example, a four-bit indicator may be defined based on the mapping relationship shown in Table 2 by adding one bit for representing the CP type (normal or extended CP) to bit combinations (three bits) for representing SCSs.

Table 2 below shows supported transmission numerologies

TABLE 2

| μ | $\Delta f = 2^\mu \cdot$ 15 [kHz] | type of CP (cyclic prefix) |
|---|---|---|
| 0 | 15 | Normal |
| 1 | 30 | Normal |
| 2 | 60 | Normal, Extended |
| 3 | 120 | Normal |
| 4 | 240 | Normal |

For example, if a different SCS/CP type is configured for each BWP, information about a carrier (channel, signal, resource pool, or BWP) for transmitting channel #Y in a band above 6 GHz, which is described in c), may be represented by a BWP index (or a parameter for representing the location of the BWP (e.g., BWP starting position, BWP width, etc.)).

Additionally, it may be predetermined between TX UE(s) and RX UE(s) which cell the numerology (e.g., SCS and/or CP type) that the TX UE desires to adjust/change and/or the channel/signal/carrier/resource pool/BWP in which the numerology is configured is for. Alternatively, it may be indicated by higher layer signaling (RRC signaling) or DCI.

This indicator may be interpreted as indicating that, from the point of view of the RX UE, i) the CP length will be changed (or be changed) to be different from the current or previously received signal, ii) a specific CP length mapped to an n-bit combination, and/or iii) reception of information about a carrier (channel, signal, resource pool, or BWP), CP length, and/or SCS for receiving channel #Y from the corresponding TX UE in a band above 6 GHz.

As described above in iii), if changing an SCS and/or CP length is interpreted as selecting/changing a carrier (channel, signal, resource pool, or BWP), the RX UE may require a time gap (i.e., switching gap) to switch the carrier (channel, signal, resource pool, or BWP) after receiving the corresponding information until channel #Y is actually received.

Further, according to an embodiment of the present disclosure, when it is difficult for the TX UE to select a candidate resource for transmitting a signal to the RX UE in consideration of a propagation delay between the TX and RX UEs, the TX UE may reselect/search for a new RX UE that will receive the signal, ignore a feedback signal (e.g., HARQ ACK/NACK) transmitted from the RX UE, or drop the signal transmission. In this case, for example, the TX UE may have difficulty in selecting the candidate resource for transmitting the signal to the RX UE in the following cases: when the TX UE transmits signals to the RX UE on all candidate resources (sequentially) and the RX UE fails to receive all the signals, or when the number of times that the RX UE fails in signal reception is more than or equal to a predetermined threshold.

The proposed methods have been described based on unicast communication in which the ratio of TX UEs to RX UEs is 1:1, but the proposed methods are not limited thereto. That is, the proposed methods may be applied similarly when there are two or more RX UEs.

It is obvious that each of the examples of the proposed methods may also be included as one implementation method, and thus each example may be regarded as a kind of proposed method.

The present disclosure is not limited to communication between UEs. That is, the present disclosure may be applied to UL or DL communication, and in this case, the proposed methods may be performed by a BS, a relay node, etc.

In addition, it may be regulated that information on whether the proposed methods are applied (or information on rules related to the proposed methods) is transmitted from a BS to a UE or from a TX UE to an RX UE through a predefined signal (e.g., a physical layer signal, a higher layer signal, etc.).

Examples of Communication System to which the Present Disclosure is Applied

Various descriptions, functions, procedures, proposals, methods and/or operational flowcharts of the present disclosure disclosed in this document are applicable, but limited, to various fields requiring wireless communication/connection (e.g., 5G) between devices.

Hereinafter, examples will be illustrated in more detail with reference to the drawings. In the following drawings/description, the same reference numerals may exemplify the same or corresponding hardware blocks, software blocks, or functional blocks, unless otherwise indicated.

Figure 18:
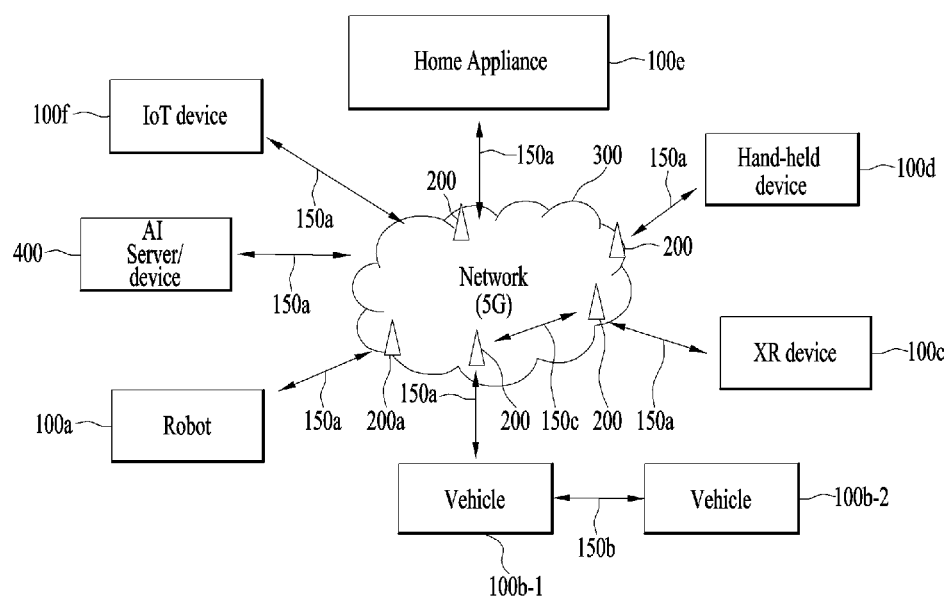
FIG. 18 is a diagram illustrating a communication system to which one embodiment of the present disclosure is applicable.

FIG. 18 illustrates a communication system applied to the present disclosure.

Referring to FIG. 18, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 19:
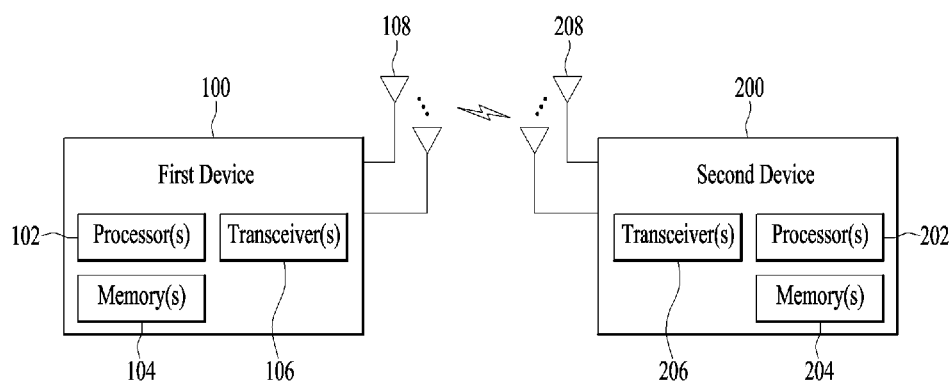
FIG. 19 is a block diagram illustrating a wireless device to which one embodiment of the present disclosure is applicable.

FIG. 19 is a block diagram illustrating a wireless device to which one embodiment of the present disclosure can be applied.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may be configured to perform at least one of the operations in the methods described above with reference to FIGS. 16 and 17. The processor(s) 102 may be configured to: control the transceiver(s) 106 and antenna(s) 108 to receive a first signal; obtain a distance between the first wireless device 100 and second wireless device 200 based on the received first signal; select a candidate resource based on the obtained distance; and transmit a second signal to the second wireless device 200 based on the selected candidate resource.

For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit to which the Present Disclosure is Applied

Figure 20:
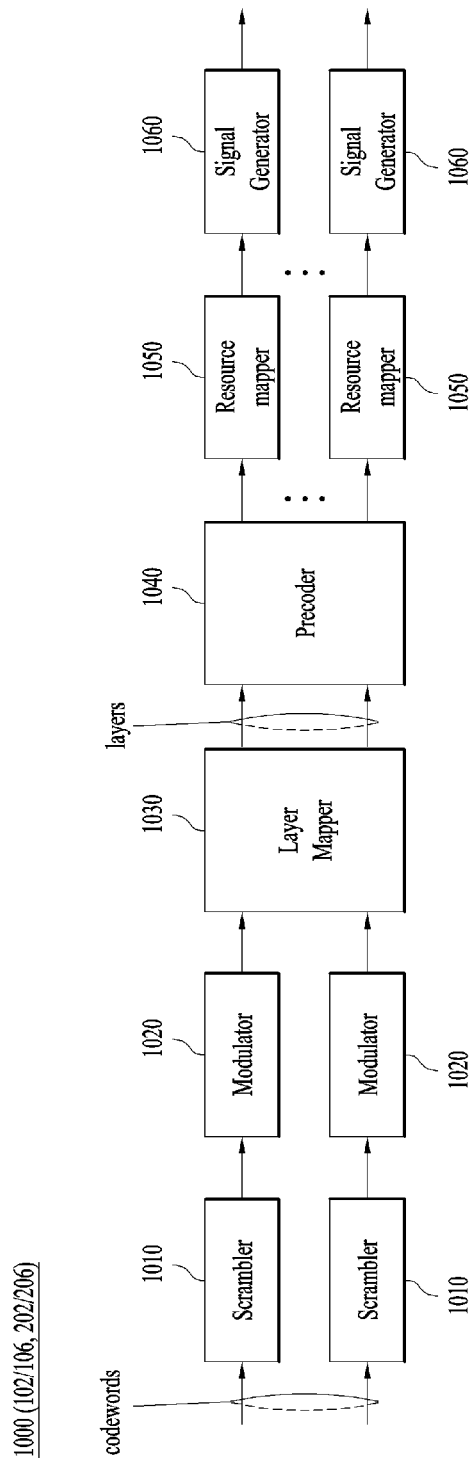
FIG. 20 is a block diagram illustrating a signal processing circuit for transmission (Tx) signals to which one embodiment of the present disclosure is applicable.

FIG. 20 is a block diagram illustrating a signal processing circuit 1000 for transmission (Tx) signals to which one embodiment of the present disclosure can be applied.

Referring to FIG. 20, the signal processing circuit 1000 may include a scrambler 1010, a modulator 1020, a layer mapper 1030, a precoder 1040, a resource mapper 1050, and a signal generator 1060. The operations/functions shown in FIG. 20 may be performed by the processors 102 and 202 and/or the transceivers 106 and 206 shown in FIG. 19, without being limited thereto. Hardware elements shown in FIG. 20 may be implemented by the processors 102 and 202 and/or the transceivers 106 and 206 shown in FIG. 19. For example, the blocks 1010 to 1060 may be implemented by the processors 102 and 202. In addition, the blocks 1010 to 1050 may be implemented by the processors 102 and 202 shown in FIG. 19, and the block 1060 may be implemented by the transceivers 106 and 206 shown in FIG. 19.

The codeword may be converted into a radio signal (or a radio frequency (RF) signal) through the signal processing circuit 1000 shown in FIG. 20. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK (pi/2-Binary Phase Shift Keying), m-PSK (m-Phase Shift Keying), m-QAM (m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an Inverse Fast Fourier Transform (IFFT) module, a Cyclic Prefix (CP) inserter, a Digital-to-Analog Converter (DAC), a frequency uplink converter, etc.

The signal processing steps for reception (Rx) signals in the wireless device may be arranged in the reverse order of the signal processing steps 1010 to 1060 shown in FIG. 20. For example, the wireless devices 100 and 200 (shown in FIG. 19) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a Fast Fourier Transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

Use Cases of Wireless Devices to which the Present Disclosure is Applied

Figure 21:
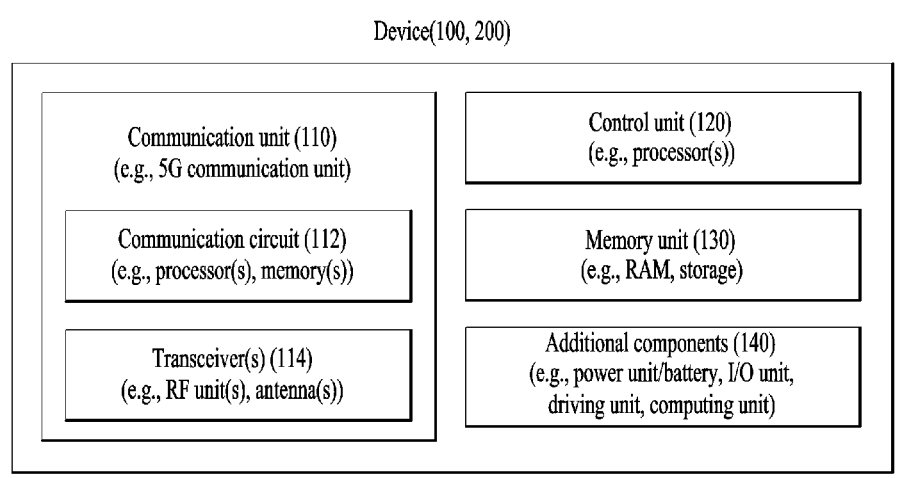
FIG. 21 is a block diagram illustrating a wireless device to which another embodiment of the present disclosure is applicable.

FIG. 21 illustrates another example of a wireless device applied to the present disclosure. The wireless device may be implemented in various forms according to a use case/service (refer to FIGS. 18, 17, 18 and 19).

Referring to FIG. 21, the wireless devices 100 and 200 correspond to the wireless devices 100 and 200 of FIG. 19, and may be composed of various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or one or more antennas 108 and 208 of FIG. 19. The control unit 120 is electrically connected to the communication unit 110, the memory unit 130, and the additional components 140 and controls overall operations of the wireless devices. For example, the controller 120 may control the electrical/mechanical operation of the wireless device based on the programs/code/commands/information stored in the memory unit 130. In addition, the control unit 120 may transmit the information stored in the memory unit 130 to an external part (e.g., another communication device) via the communication unit 110 through a wireless/wired interface, or store, in the memory unit 130, information received through the wireless/wired interface from an external part (e.g., another communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire, and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphics processor, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Hereinafter, an example implementation of FIG. 21 will be described in detail with reference to the drawings.

Example of Hand-Held Device to which the Present Disclosure is Applied

Figure 22:
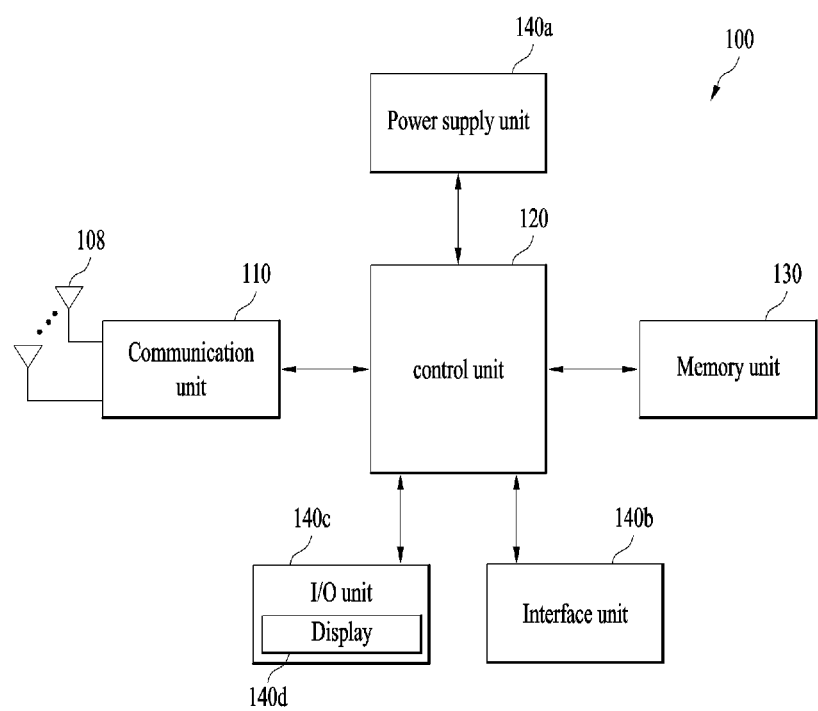
FIG. 22 is a block diagram illustrating a hand-held device to which another embodiment of the present disclosure is applicable.

FIG. 22 is a block diagram illustrating a hand-held device 100 to which another embodiment of the present disclosure can be applied. The hand-held device may include a smartphone, a tablet (also called a smartpad), a wearable device (e.g., a smartwatch or smart glasses), and a portable computer (e.g., a laptop). The hand-held device 100 may be referred to as a mobile station (MS), a user terminal (UT), a mobile subscriber station (MSS), a subscriber station (SS), an advanced mobile station (AMS), or a wireless terminal (WT).

Referring to FIG. 22, the hand-held device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. The blocks 110 to 130/140a to 140c correspond to the blocks 110 to 130/140 of FIG. 21, respectively.

The communication unit 110 may transmit and receive signals (e.g., data and control signals) to and from another wireless device and a BS. The control unit 120 may perform various operations by controlling elements of the hand-held device 100. The control unit 120 may include an application processor (AP). The memory unit 130 may store data/parameters/programs/code/commands required for operation of the hand-held device 100. Further, the memory unit 130 may store input/output data/information. The power supply unit 140a may supply power to the hand-held device 100, and include a wired/wireless charging circuit and a battery. The interface unit 140b may support connection between the hand-held device and other external devices. The interface unit 140b may include various ports (e.g., an audio I/O port and a video I/O port) for connection to external devices. The I/O unit 140c may receive or output video information/signal, audio information/signal, data, and/or user-input information. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signals in the memory unit 130. The communication unit 110 may convert the information/signals into radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 23:
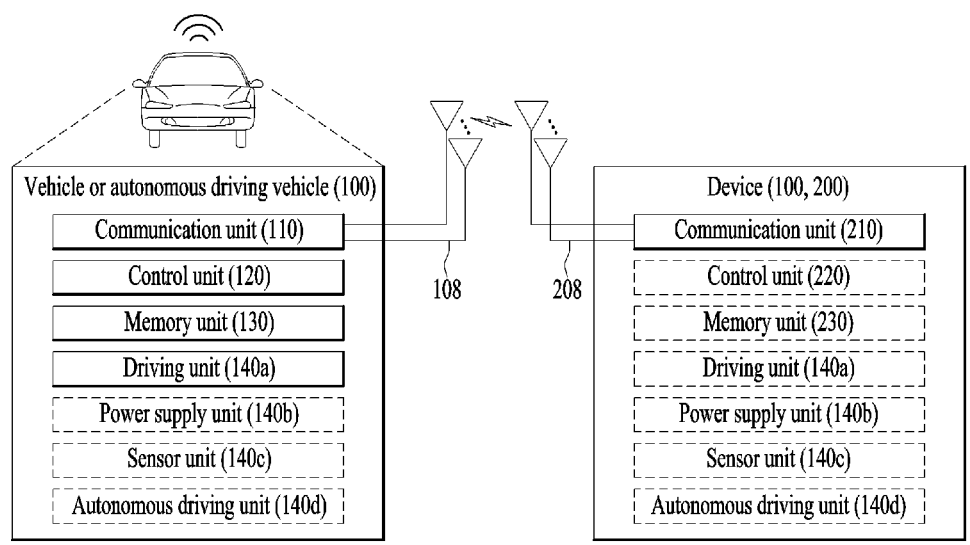
FIG. 23 is a block diagram illustrating a vehicle or an autonomous driving vehicle to which another embodiment of the present disclosure is applicable.

Examples of Vehicles or Autonomous Vehicles to which the Present Disclosure is Applied FIG. 23 illustrates an example vehicle or autonomous driving vehicle applied to the present disclosure. The vehicle or autonomous driving vehicle may be implemented as a mobile robot, a vehicle, a train, a manned/unmanned aerial vehicle (AV), or a ship.

Referring to FIG. 23, the vehicle or autonomous driving vehicle 100 may include an antenna unit 108, a communication unit 110, a control unit 120, a driving unit 140a, a power supply unit 140b, and a sensor unit 140c, and an autonomous driving unit 140d. The antenna unit 108 may be configured as a part of the communication unit 110. The blocks 110, 130, and 140a to 140c correspond to the blocks 110, 130, and 140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU).

The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to which the Present Disclosure is Applied

Figure 24:
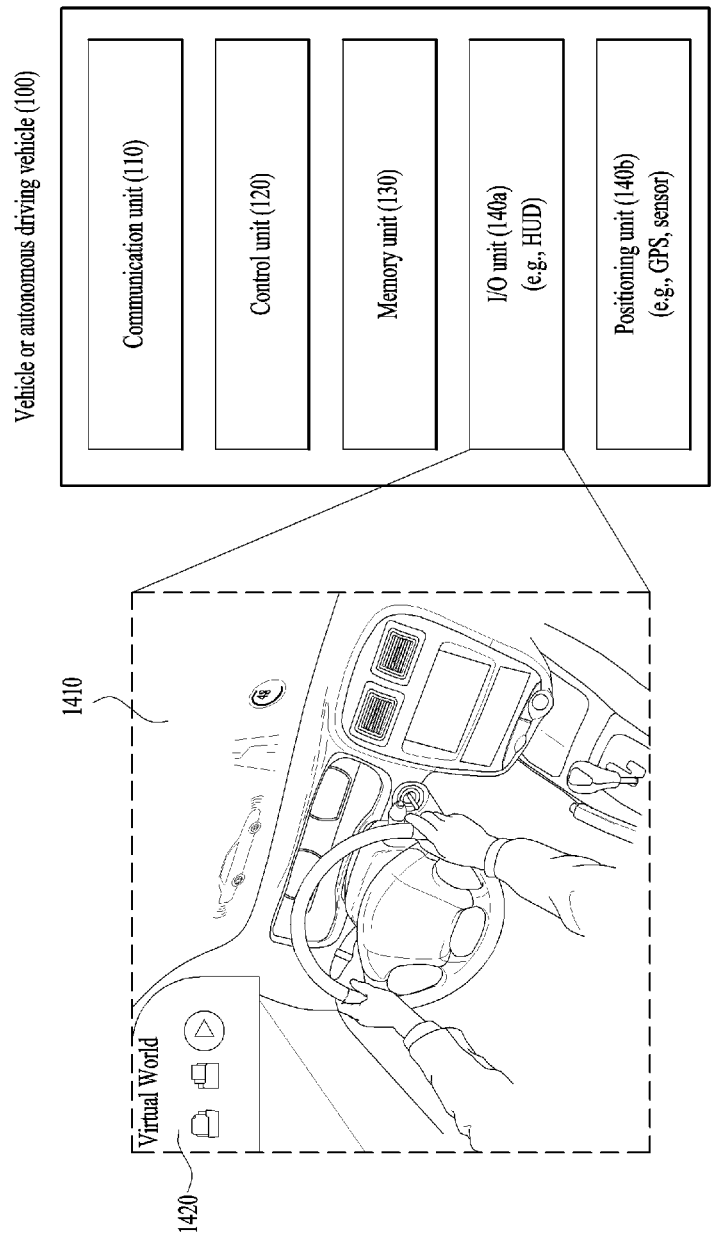
FIG. 24 is a block diagram illustrating a vehicle to which another embodiment of the present disclosure.

FIG. 24 illustrates a vehicle applied to the present disclosure. The vehicle may also be implemented as a transportation means, a train, an aircraft, or a ship.

Referring to FIG. 24, the vehicle 100 may include a communication unit 110, a control unit 120, a memory unit 130, an input/output unit 140a, and a positioning unit 140b. Here, blocks 110 to 130/140a to 140b correspond to the blocks 110 to 130/140 of FIG. 21, respectively.

The communication unit 110 may transmit and receive signals (e.g., data, control signals, etc.) to and from other vehicles or external devices such as a base station. The controller 120 may perform various operations by controlling the components of the vehicle 100. The memory unit 130 may store data/parameters/programs/codes/commands supporting various functions of the vehicle 100. The input/output unit 140a may output an AR/VR object based on information in the memory unit 130. The input/output unit 140a may include a HUD. The positioning unit 140b may acquire location information about the vehicle 100. The location information may include absolute location information about the vehicle 100, location information within a driving lane, acceleration information, and location information with respect to nearby vehicles. The positioning unit 140b may include a GPS and various sensors.

As an example, the communication unit 110 of the vehicle 100 may receive map information, traffic information, and the like from an external server and store the same in the memory unit 130. The positioning unit 140b may acquire vehicle location information through the GPS and various sensors and store the vehicle location information in the memory unit 130. The control unit 120 may generate a virtual object based on the map information, traffic information, vehicle location information, and the like, and the input/output unit 140a may display the generated virtual object on the inner side of the windshield of the vehicle. In addition, the controller 120 may determine whether the vehicle 100 is operating normally within a driving lane based on the vehicle location information. When the vehicle 100 abnormally deviates from the driving lane, the control unit 120 may display a warning on the windshield of the vehicle through the input/output unit 140a. In addition, the controller 120 may broadcast a warning message about a driving abnormality to nearby vehicles through the communication unit 110. Depending on the situation, the controller 120 may transmit location information about the vehicle and information about driving/vehicle abnormalities to a related organization through the communication unit 110.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this document, embodiments of the present disclosure have been described mainly based on a signal transmission/reception relationship between a terminal and a base station. Such a transmission/reception relationship is applied to signal transmission/reception between a terminal and a relay or between a base station and a relay in in the same/similar manner In some cases, a specific operation described in this document as being performed by the base station may be performed by an upper node thereof. That is, it is apparent that various operations performed for communication with a terminal in a network including a plurality of network nodes including a base station may be performed by the base station or network nodes other than the base station. The base station may be replaced with terms such as fixed station, Node B, eNode B (eNB), gNode B (gNB), access point, or the like. In addition, the terminal may be replaced with terms such as User Equipment (UE), Mobile Station (MS), Mobile Subscriber Station (MSS), or the like.

The examples of the present disclosure may be implemented through various means. For example, the examples may be implemented by hardware, firmware, software, or a combination thereof. When implemented by hardware, an example of the present disclosure may be implemented by one or more application specific integrated circuits (ASICs), one or more digital signal processors (DSPs), one or more digital signal processing devices (DSPDs), one or more programmable logic devices (PLDs), one or more field programmable gate arrays (FPGAs), one or more processors, one or more controllers, one or more microcontrollers, one or more microprocessor, or the like.

When implemented by firmware or software, an example of the present disclosure may be implemented in the form of a module, a procedure, or a function that performs the functions or operations described above. Software code may be stored in a memory unit and executed by a processor. The memory unit may be located inside or outside the processor, and may exchange data with the processor by various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-mentioned embodiments of the present disclosure are applicable to various mobile communication systems.

The invention claimed is:

1. A method of transmitting a signal by a first user equipment (UE) in a wireless communication system supporting a plurality of frequency ranges (FRs), the method comprising:
   detecting, by the first UE in a first FR before transmitting a second signal in a second FR higher than the first FR, a first signal from a second UE;
   obtaining, by the first UE, a UE-to-UE distance between the first UE and the second UE based on the first signal in the first FR;
   determining, by the first UE, a subcarrier spacing (SCS) and a cyclic prefix (CP) length for the second FR, based on the UE-to-UE distance; and
   transmitting, by the first UE, the second signal to the second UE in the second FR based on the determined SCS and the determined CP length.

2. The method of claim 1,
   wherein the first signal includes information about a location of the second UE, and
   wherein the UE-to-UE distance is obtained based on the information about the location of the second UE.

3. The method of claim 2, wherein the information about the location of the second UE includes at least one of a cooperative awareness message (CAM) and a basic safety message (BSM).

4. The method of claim 1,
   wherein the first FR is below 6 GHz, and
   wherein the second FR is above 6 GHz.

5. The method of claim 1, wherein the UE-to-UE distance is determined based on at least one of signal strength of the first signal and channel quality between the first UE and the second UE.

6. The method of claim 1, further comprising:
   transmitting, by the first UE in the first FR, a third signal including information about the SCS and the CP length determined for the second FR to the second UE before transmitting the second signal in the second FR.

7. The method of claim 6, wherein the third signal further includes bitmap information regarding updates of the SCS and the CP length.

8. The method of claim 1, further comprising:
   receiving, by the first UE, control information from a base station,
   wherein the control information includes a plurality of candidate SCSs and a plurality of candidate CP lengths for the second FR.

9. A first user equipment (UE) in a wireless communication system supporting a plurality of frequency ranges (FRs), the first UE comprising:
   a transceiver; and
   a processor,
   wherein the processor is configured to:
   detect, in a first FR before transmitting a second signal in a second FR higher than the first FR, a first signal from a second UE;
   obtain a UE-to-UE distance between the first UE and the second UE based on the first signal in the first FR;
   determine a subcarrier spacing (SCS) and a cyclic prefix (CP) length for the second FR, based on the UE-to-UE distance; and
   transmit the second signal to the second UE in the second FR based on the determined SCS and the determined CP length.

10. The first UE of claim 9, wherein the first UE is configured to communicate at least one of a mobile terminal, a network, and an autonomous driving vehicle.

11. The first UE of claim 9, wherein the first UE is configured to implement at least one advanced driver assistance system (ADAS) function based on a signal for controlling movement of the first UE.

12. The first UE of claim 9, wherein the UE is configured to switch a driving mode of an apparatus from an autonomous driving mode to a manual driving mode or from the manual driving mode to the autonomous driving mode upon receipt of a user input.

13. The first UE of claim 9, wherein the first UE is configured to perform autonomous driving based on external object information, and wherein the external object information includes at least one of information about presence of an object, information about a location of the object, information about a distance between the first UE and the object, or information about a relative speed of the first UE with respect to the object.

14. The first UE of claim 9, wherein the first UE is capable of communicating with at least one of another UE, a UE related to an autonomous driving vehicle, a base station or a network.

* * * * *